US 6,674,605 B1

(12) United States Patent
Ell

(10) Patent No.: US 6,674,605 B1
(45) Date of Patent: *Jan. 6, 2004

(54) PQ ENHANCED DUAL STAGE SERVO CONTROLLER

(75) Inventor: Travis E. Ell, Oklahoma City, OK (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/553,365

(22) Filed: Apr. 20, 2000

Related U.S. Application Data

(60) Provisional application No. 60/130,310, filed on Apr. 21, 1999, and provisional application No. 60/137,752, filed on Jun. 4, 1999.

(51) Int. Cl.[7] .............................................. G11B 5/596
(52) U.S. Cl. .................. 360/78.05; 360/78.12
(58) Field of Search .......................... 360/78.05, 78.12, 360/78.09, 78.14, 75, 78.04, 77.02

(56) References Cited

U.S. PATENT DOCUMENTS

| 5,060,210 A | * 10/1991 | Fennema et al. | 369/30.15 |
|---|---|---|---|
| 5,452,275 A | 9/1995 | Ogawa | 369/44.11 |
| 5,510,939 A | 4/1996 | Lewis | 360/78.09 |
| 5,883,749 A | 3/1999 | Park | 360/75 |
| 6,005,742 A | * 12/1999 | Cunningham et al. | 360/78.05 |

FOREIGN PATENT DOCUMENTS

EP  0 924 689 A2  12/1998  ............ G11B/5/55

OTHER PUBLICATIONS

On Controller Design for Linear Time–Invariant Dual–Input Single–Output Systems, Steven J. Schroeck et al., Depart. of Mechanical Engineering and Data Storage System Center, Carnegie Mellon University, Pitts., PA.

* cited by examiner

Primary Examiner—Andrew L. Sniezek
(74) Attorney, Agent, or Firm—Westman, Champlin & Kelly, P.A.

(57) ABSTRACT

A servo controller controls the servo system in a disc drive. A proportional integrator component receives the target track signal indicative of a target track and a measured track signal indicative of actual or measured data head position. During seek mode, the proportional integrator provides an output signal based on the measured track signal and the target track signal. A profile generator component provides a profile signal based on the output signal from the proportional integrator. A coarse actuator is driven based on the profile signal. A filter component is coupled to the profile generator and filters the profile signal to provide a filtered profile signal. The fine actuator is driven based on the filtered profile signal.

20 Claims, 26 Drawing Sheets

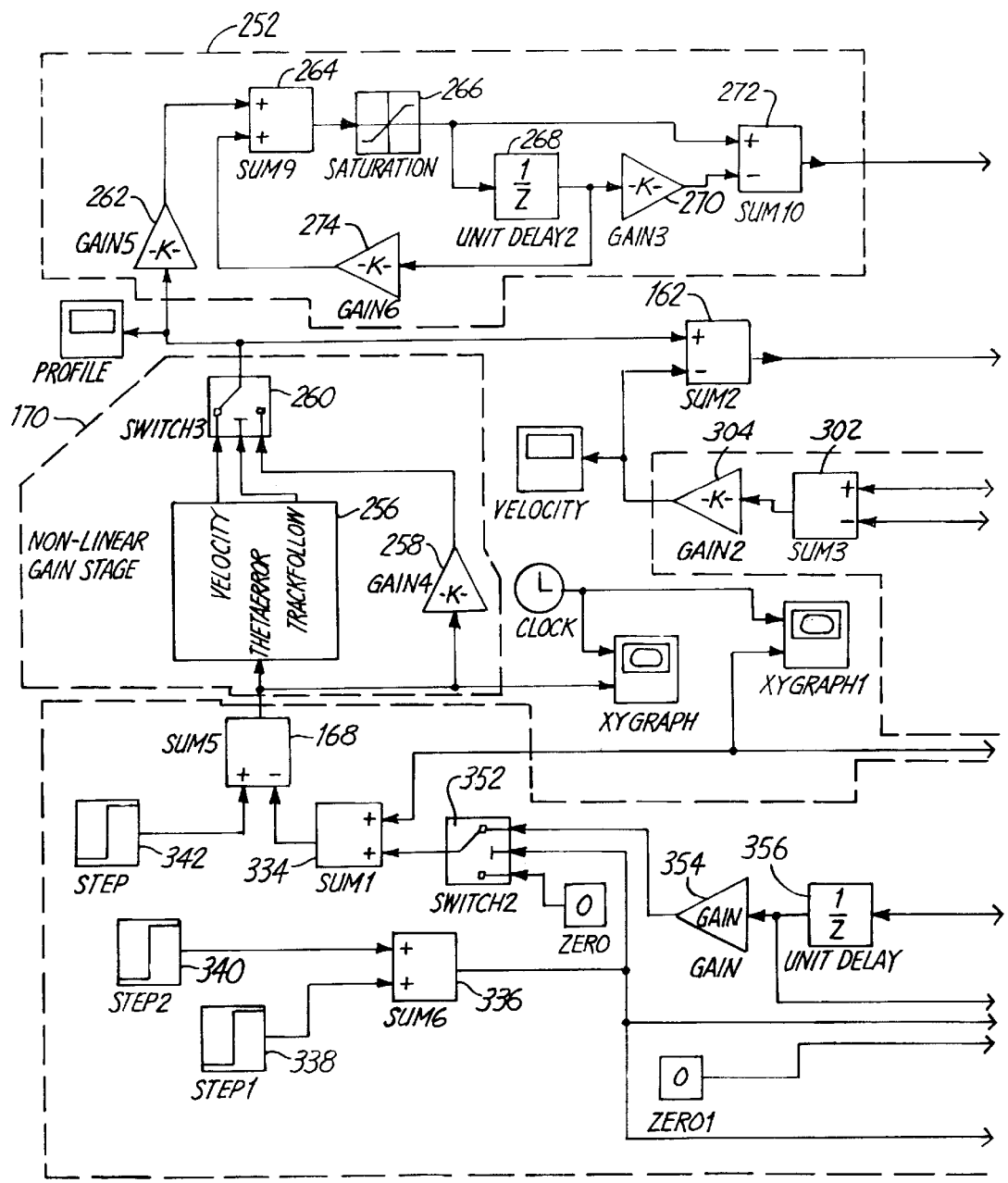
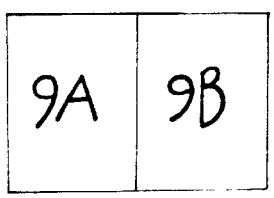
FIG. 9A
FIG. 9

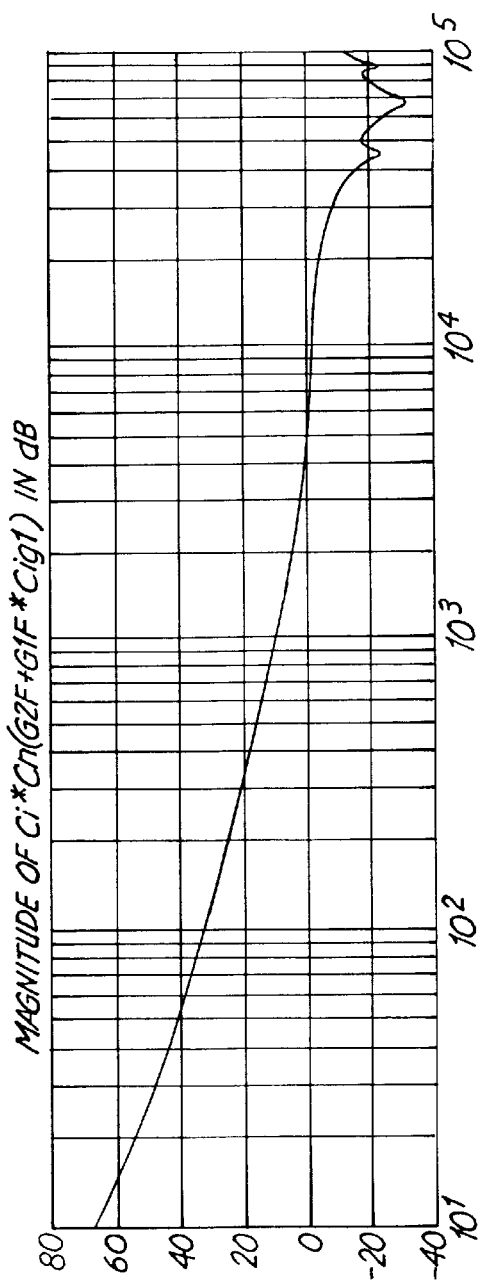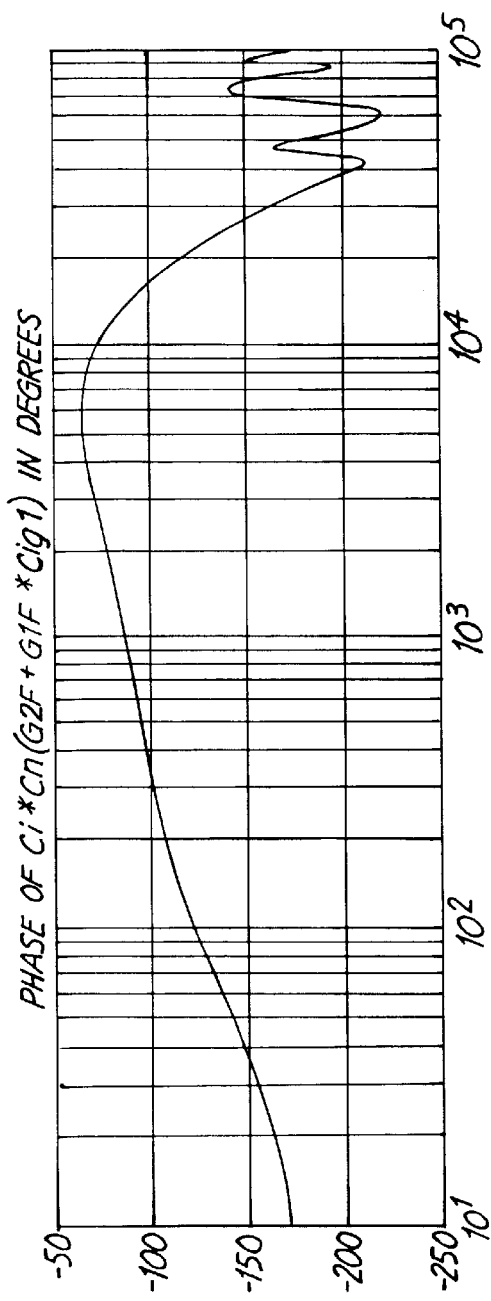

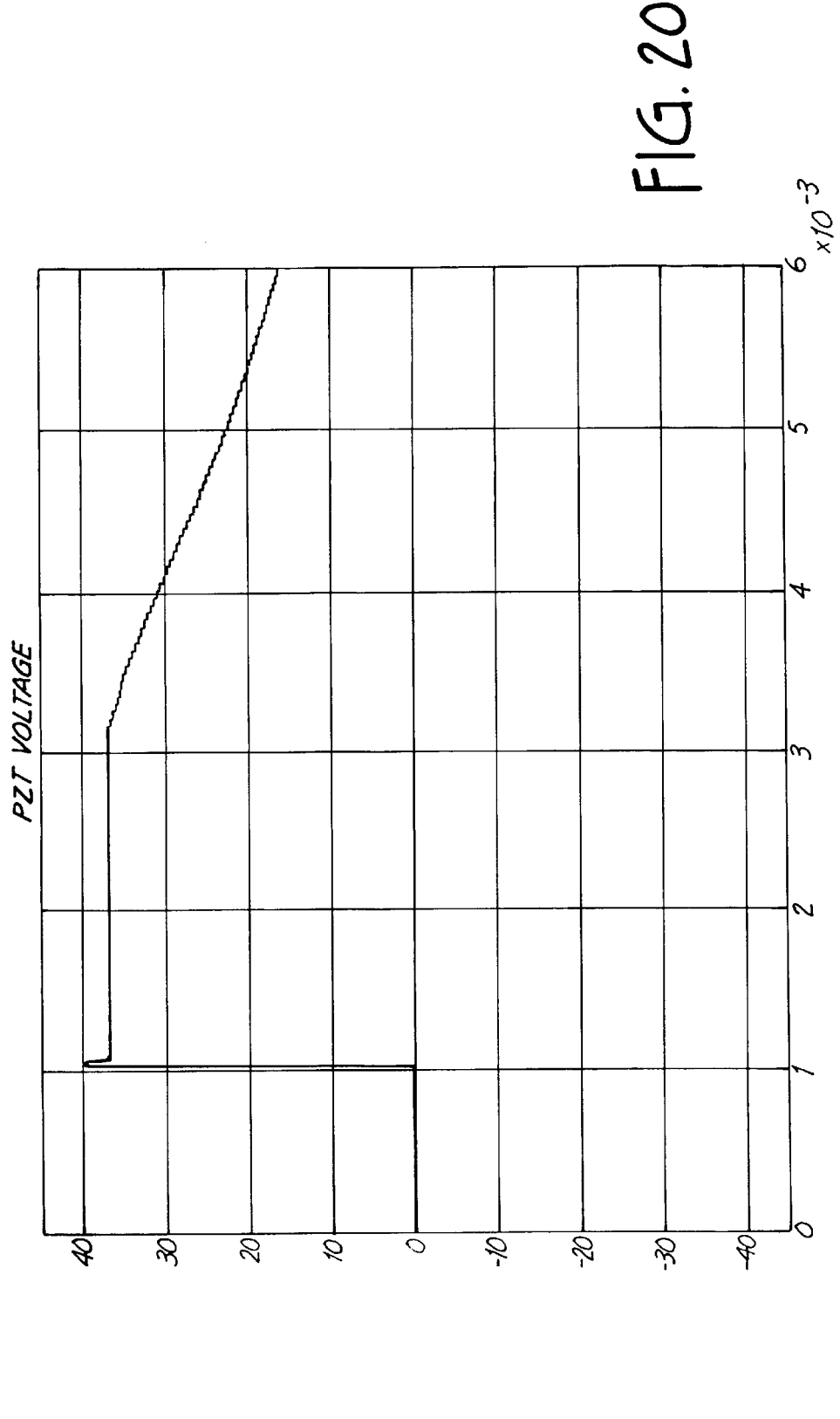

PQ ENHANCED DUAL STAGE SERVO CONTROLLER

This application claims benefit from Prov. No. 60/130,310 filed Apr. 21, 1999 and No. 60/137,752 filed Jun. 4, 1999.

FIELD OF THE INVENTION

The present invention relates generally to a servo system in a disc drive. More particularly, the present invention relates to a disc drive having an enhanced dual stage servo control system.

BACKGROUND OF THE INVENTION

A typical disc drive includes one or more discs mounted for rotation on a hub or spindle. A typical disc drive also includes one or more transducers supported by an air bearing which flies above each disc. The transducers and the air bearing are collectively referred to as a data head. A drive controller is conventionally used for controlling the disc drive system based on commands received from a host system. The drive controller controls the disc drive to retrieve information from the discs and to store information on the discs.

An actuator typically operates within a closed-loop servo system. The actuator typically includes an actuator arm that supports a flexure of flexure assembly which, in turn, supports the data head. The actuator moves the data head radially over the disc surface for track seek operations and holds the transducer directly over a track on the disc surface for track following operations. The time when the data head is near a target track and fine tuning its position just prior to commencing track following is referred to as track settle or seek settle.

Information is typically stored on the discs by providing a write signal to the data head to encode information on the surface of the disc representing the data to be stored. In retrieving data from the disc, the drive controller controls the servo actuator so that the data head flies above the disc, sensing the on the disc, and generating a read signal based on that information. The read signal is then decoded by the drive controller to recover the data represented by the information stored on a disc, and consequently represented in the read signal provided by the data head.

Accurate positioning of the data head over a track on the disc is of great importance in writing data to the disc and reading data from the disc.

In prior systems, servo operations were accomplished based on a dedicated servo head. In a dedicated servo type of system, servo information is all written to one dedicated surface of a disc in the disc drive. All of the heads in the disc drive are mechanically coupled to the servo head which is used to access the servo information. Thus, all of the heads in the dedicated servo disc drive are positioned based on the servo information read from the servo surface. This type of system allows the disc drive to conveniently execute parallel read and write operations. In other words, with appropriate circuitry in the drive controller, read and write operations can be executed in parallel using a plurality of the data heads mounted on the actuator, the data heads being simultaneously positioned based on the servo information read from the dedicated servo surface.

However, track densities on magnetic discs have been increasing for many years. Increased track densities on the magnetic disc require more accurate and higher resolution positioning. The mechanical offset between heads in a dedicated servo system can exceed one track width. Thus, the industry has seen a tendency to shift to embedded servo information in certain applications.

In an embedded servo system, servo information is embedded on each track on each surface of every disc. Thus, each data head returns a position signal independently of the other data heads. Therefore, the servo actuator is used to position each individual data head while that particular data head is accessing information on the disc surface. The positioning is accomplished using the embedded servo data for the track over which the data head is then moving.

Prior conventional servo controllers have included proportional-integral-derivative (PID) controllers which are composed of two components: an observer and a regulator. The observer receives input position information each time a servo sector is crossed, and estimates position and velocity. The regulator then provides feedback on the observed signals. In a seek mode, the regulator typically zeros the error between a reference velocity trajectory and the observed velocity. In track following mode, the regulator zeros the error between the desired track position and the observed track position. The regulator controls according to a PID control technique.

However, PID controllers can be difficult to implement in all disc drive applications. For example, it may be desirable to provide microactuators between the flexure assembly and the transducer or slider assembly or on the actuator arm or on the suspension or flexure assembly. Where microactuators are provided, the servo actuator system might evolve from a single input single output (SISO) system where the input is an error signal and the output is a voice coil current signal, to a multiple input multiple output (MIMO) system which receives a variety of inputs from the microactuators and provides a position output signal to the voice coil motor and each of the microactuators. Such a system could also be controlled by simply decentralizing a PID controller so one target track input is received, but two outputs are provided, one for the voice coil motor and one for the microactuator. This may present problems. For example, it is difficult to control both actuators with a single controller while maintaining desired gain and stability for both control loops during track follow as well as track seek and settle. While Messner has discussed a system in Schroeck and Messner, On Controller Design For Linear Time-Invariant Dual-Input Single-Output Systems this is only directed to accommodating track follow with a PQ controller.

SUMMARY OF THE INVENTION

A servo controller controls the servo system in a disc drive. During a track seek mode of operation, a proportional integrator component receives the target track signal indicative of a target track and a measured track signal indicative of measured or actual data head position. The proportional integrator provides an output signal based on the measured track signal and the target track signal. A profile generator component provides a profile signal based on the target track signal and the output signal from the proportional integrator. A coarse actuator is driven based on the profile signal. A filter component is coupled to the profile generator and filters the profile signal to provide a filtered profile signal. The fine actuator is driven based on the filtered profile signal.

BRIEF DESCRIPTION OF THE DRAWINGS

FIGS. 7-1 to 7-6 are Bode plots and phase diagrams corresponding to the control system shown in FIGS. 4–6.

FIGS. 9, 9A and 9B illustrate a more detailed block diagram of the control system shown in FIG. 8.

FIGS. 10-1 to 10-10 are Bode plots and phase diagrams corresponding to elements of the control system shown in FIG. 9.

FIGS. 11-1 to 11-4 are graphs illustrating the output of the profile generator and the velocity and current of the voice coil actuator versus number of tracks go to a target track.

FIGS. 12-1 and 12-2 are a Bode plot and phase diagram, respectively, of a lag network in accordance with one embodiment of the present invention.

FIGS. 13-1 and 13-2 are a Bode plot and phase diagram of a notch component in accordance with one embodiment of the present invention.

FIGS. 14-1 and 14-2 are a Bode plot and phase diagram of an error function.

FIGS. 15–20 show graphs of a position error sample, track error, velocity profile, velocity tachometer output, voice coil motor current and microactuator voltage, respectively.

DETAILED DESCRIPTION OF ILLUSTRATIVE EMBODIMENTS

Figure 1:
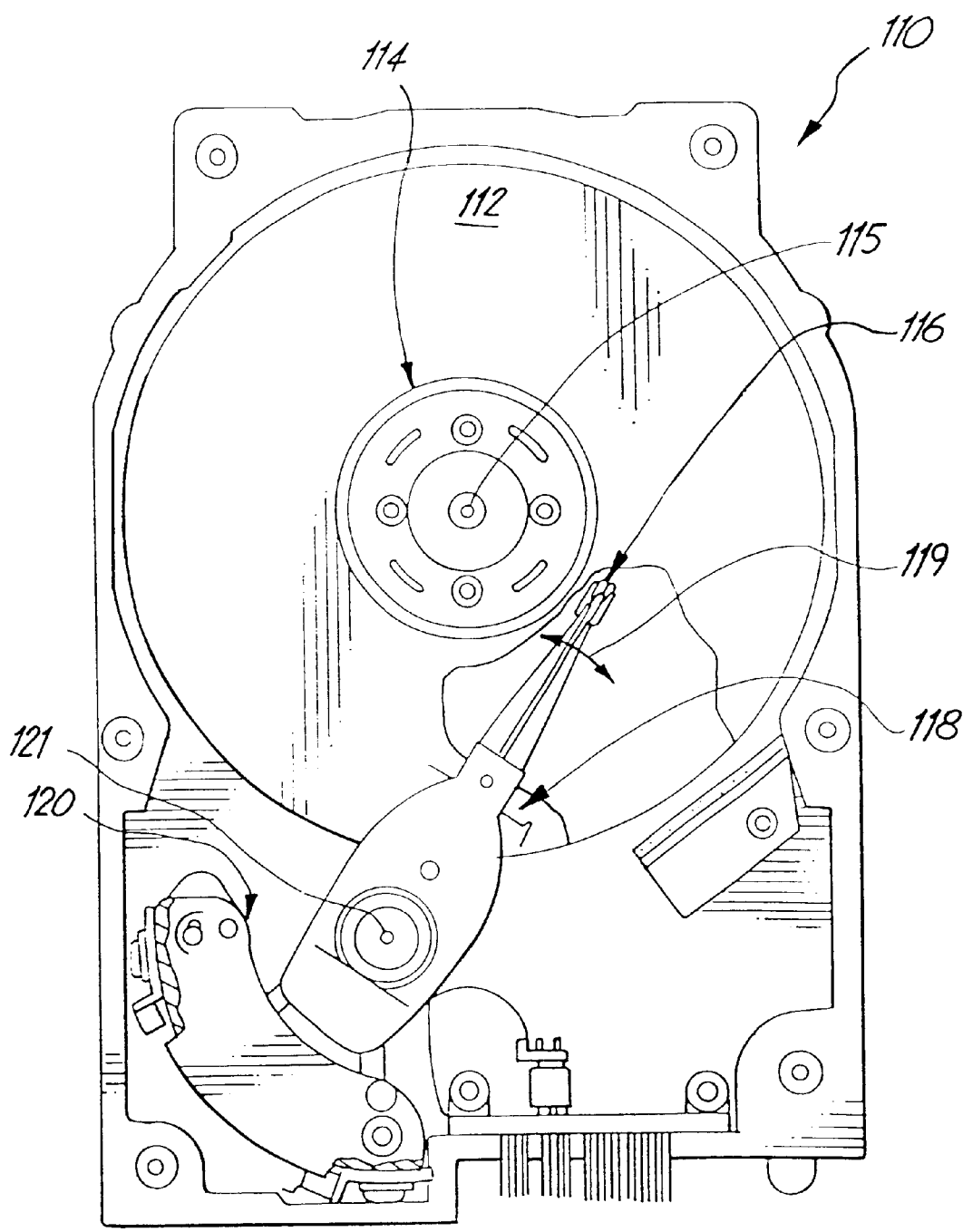
FIG. 1 illustrates a disc drive in accordance with one embodiment of the present invention.

FIG. 1 is a plan view of one embodiment of a disc drive 110. Disc drive 110 includes a disc pack 112, which is mounted on a spindle motor (not shown) by a disc clamp 114. Disc pack 112, in one embodiment, includes a plurality of individual discs which are mounted for co-rotation about a central axis 115. Each disc surface on which data is stored has an associated data head or head gimbal assembly (HGA) 116 which is mounted to an actuator assembly 118 in disc drive 110. The actuator assembly shown in FIG. 1 is of the type known as a rotary moving coil actuator and includes a voice coil motor (VCM) shown generally at 120. Voice coil motor 120 rotates actuator assembly 118 with its attached HGAs 116 about a pivot axis 121 to position HGAs 116 over desired data tracks on the associated disc surfaces, under the control of electronic circuitry housed within disc drive 110.

More specifically, actuator assembly 118 pivots about axis 121 to rotate head gimbal assemblies 116 generally along an arc 119 which causes each head gimbal assembly 116 to be positioned over a desired one of the tracks on the surfaces of discs in disc pack 112. HGAs 116 can be moved from tracks lying on the innermost radius, to tracks lying on the outermost radius of the discs. In one embodiment, each head gimbal assembly 116 has a gimbal which resiliently supports a slider relative to a load beam so that the slider can follow the topography of the disc. The slider, in turn, includes a transducer which is utilized for encoding information on, and reading information from, the surface of the disc over which it is moving. It should be noted that the information can be magnetically encoded, optically encoded, etc.

Figure 2:
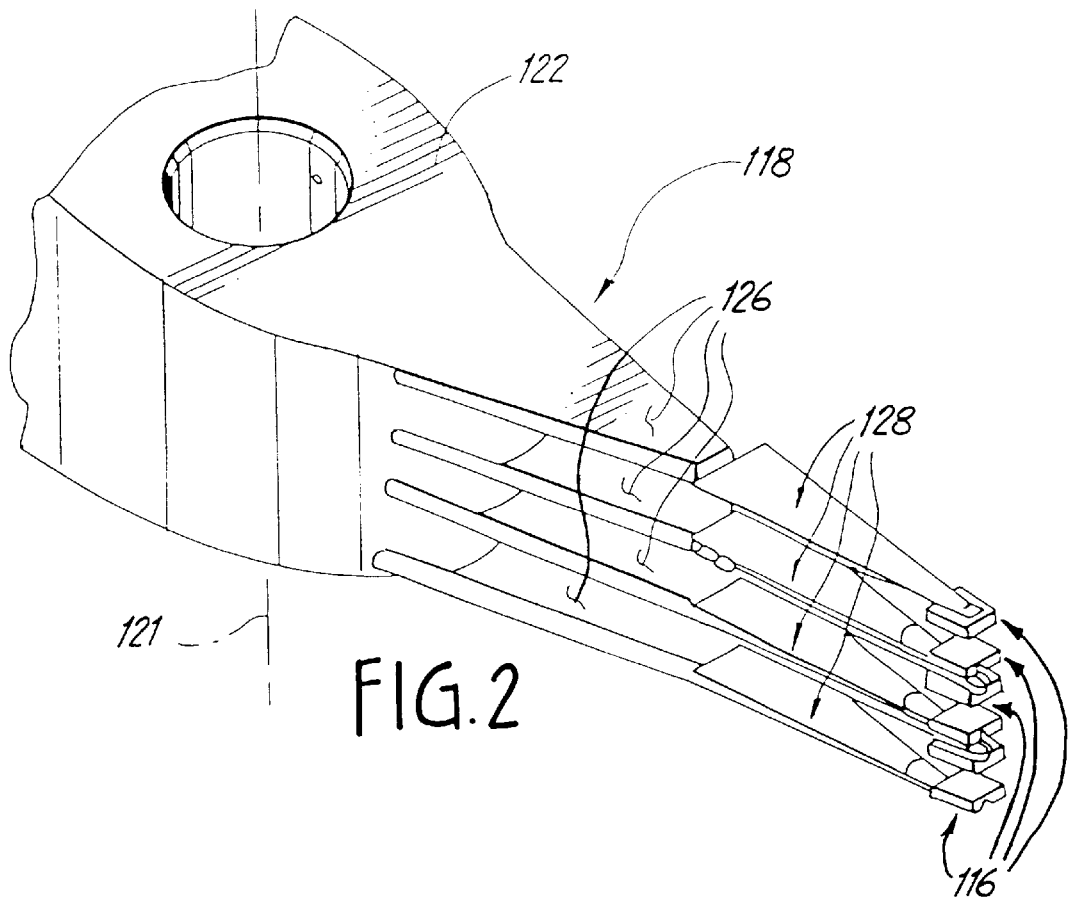
FIG. 2 illustrates an actuator assembly in accordance with one embodiment of the present invention.

FIG. 2 is a perspective view of actuator assembly 118. Actuator assembly 118 includes base portion 122, a plurality of actuator arms 126, a plurality of microactuators 127 (which can reside between the slider and the suspension, between the data head and the slider, or elsewhere), a plurality of load beams 128, and a plurality of head gimbal assemblies or suspensions 116. Base portion 122 includes a bore which is, in one embodiment, coupled for pivotal movement about axis 121. Actuator arms 126 extend from base portion 122 and are each coupled to the first end of either one or two load beams 128. Load beams 128 each have a second end which is coupled to a head gimbal assembly 116.

Figure 3:
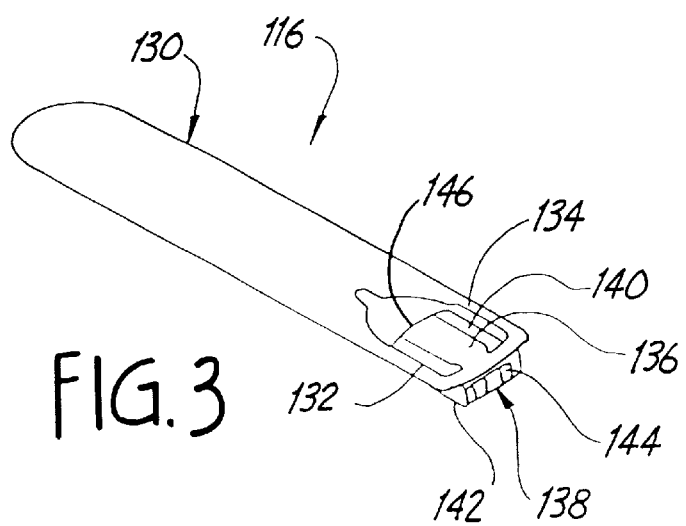
FIG. 3 illustrates a head gimbal assembly in accordance with one embodiment of the present invention.

FIG. 3 illustrates a greatly enlarged view of one embodiment a head gimbal assembly 116, although many other embodiments could be used as well. Head gimbal assembly 116 includes gimbal 130, which has a pair of struts 132 and 134, and a gimbal bond tongue 136. Head gimbal assembly 116 also includes slider 138 which has an upper surface 140 and a lower, air bearing surface 142. Transducers 144 are also illustratively located on a leading edge of slider 138. The particular attachment between slider 138 and gimbal 130 is accomplished in any desired manner, as can the attachment of microactuator 127 to the assembly to move the transducer. Briefly, in one embodiment, a compliant sheer layer is coupled between the upper surface 140 of slider 138 and a lower surface of gimbal bond tongue 136, with an adhesive. The compliant sheer layer permits relative lateral motion between slider 138 and gimbal bond tongue 136. The compliant sheer layer is illustratively a mylar film having a thickness of approximately 150 microns. Also, gimbal bond tongue 136 illustratively terminates at a trailing edge of slider 138 with a mounting tab 146 which provides a surface at which slider 138 is attached to gimbal bond tongue 136.

Figure 4:
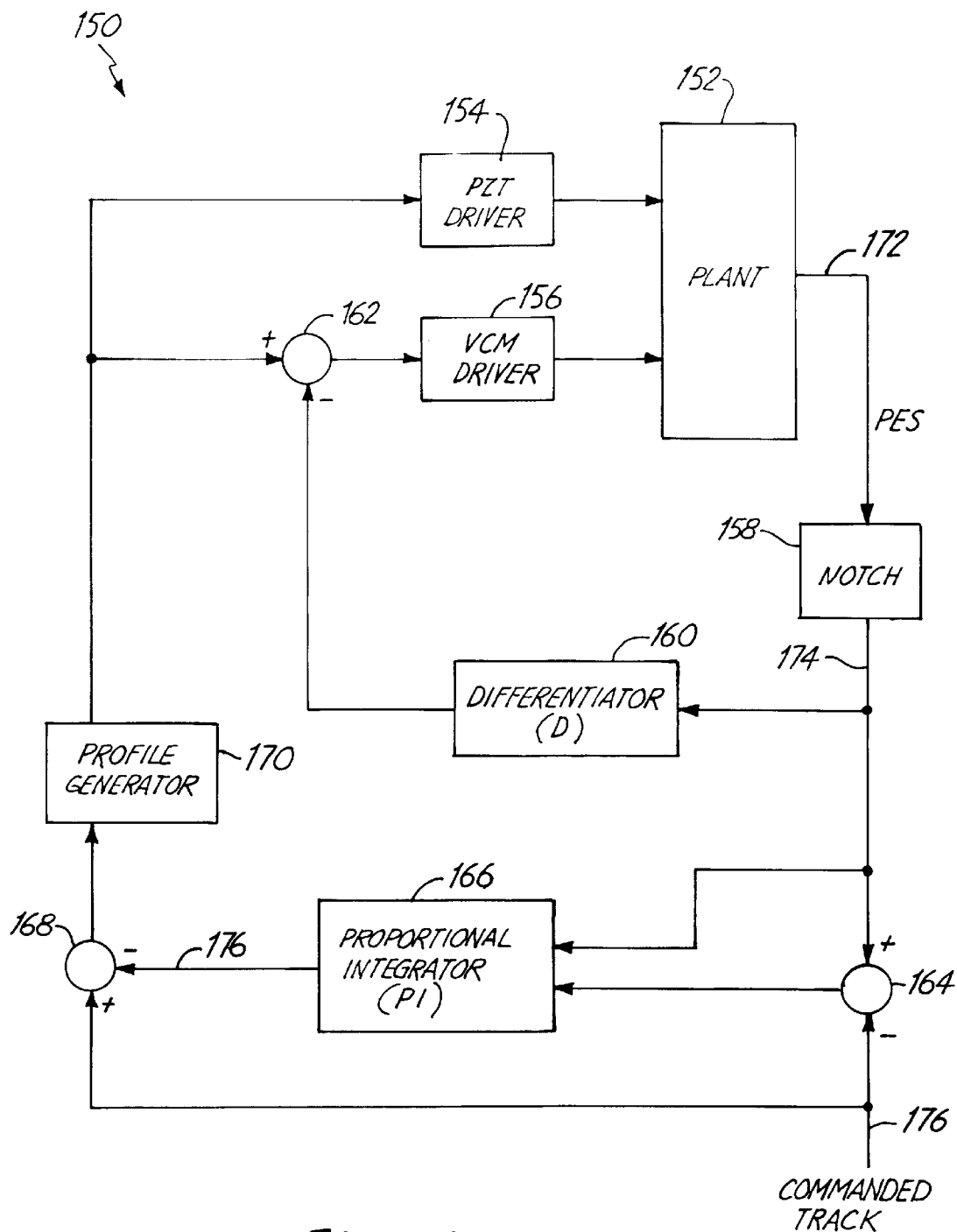
FIG. 4 illustrates a servo control system.

FIG. 4 is a block diagram illustrating servo control system 150. System 150 is shown controlling plant 152 which illustratively corresponds to voice coil motor 120 and microactuator 127. In one illustrative embodiment, the microactuator 127 is a PZT element. Although many other embodiments could being implemented, the present discussion continues with respect to the microactuator being implemented as a PZT element.

System 150 also includes PZT driver 154, VCM driver 156, notch filter 158, differentiator 160, summing nodes 162 and 164, proportional integrator (PI) 166, summing node 168 and profile generator 170. Position error sample (PES) signal 172 is based on information read from a disc and represents the position of the data head relative to the target track center. PES signal 172 is provided to notch filter 158 which filters notches at desired frequencies and provides a notch PES signal 174. The notch PES signal 174 is provided to differentiator 160, proportional integrator 166 and summing node 164.

A commanded track signal (or target track signal) 176 is provided and is indicative of a track to be accessed on a disc in the disc drive. The commanded track signal 176 is provided to summing node 164 and summing node 168. Proportional integrator 166 provides an output signal 178 based on the notched PES signal 174 and the output from summing node 164. The output signal from PI 166 is summed with the commanded track signal and is provided to profile generator 170. The notched PES signal 174 is also provided to differentiator 160 which provides a differentiated output signal 162.

Profile generator 170 generates a voice coil motor current profile (or velocity profile) based on a distance that the data head is from the target track. When the data head is located a long distance from the target track, profile generator 170 generates a non-linear profile to quickly accelerate movement of the data head toward the target track. As the data head approaches the target track, profile generator 170 provides a linear gain which corresponds to the distance of the data head from the target track. This allows the data head velocity to slow down as it approaches the target track. The output of profile generator 170 is provided to PZT driver 154 and summing node 162.

The output of summing node 162 is provided, in turn, to voice coil motor driver (VCM driver) 156. PZT driver 154 provides an output signal (illustratively voltage) to the PZT microactuator in plant 152 to drive the microactuator. Similarly, VCM driver 156 provides an output signal (illustratively a current) to the voice coil motor in plant 152 to drive rotation of the voice coil motor.

Figure 5:
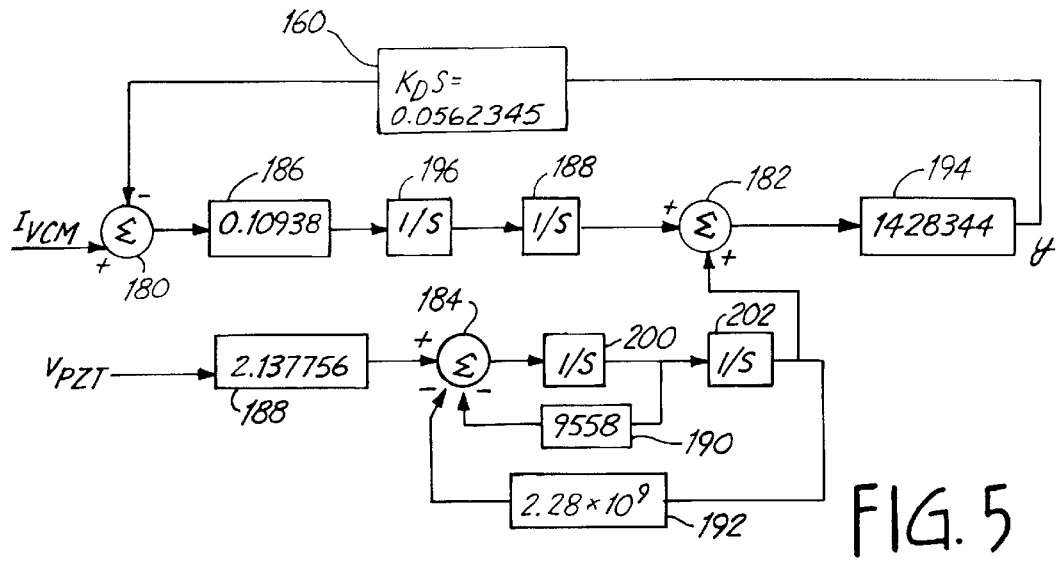
FIGS. 5 and 6 illustrate partial schematic diagrams corresponding to the control system shown in FIG. 4.

When viewing control system 150 differently, such that PZT driver 154, VCM driver 156, plant 152 and differentiator 160 are all viewed as part of a "new" plant, that portion of control system 150 can be illustrated by the block diagram set out in FIG. 5. The circuit includes differentiator 160, summing nodes 180, 182 and 184, gain blocks 186, 188, 190, 192 and 194, and integrators 196, 198, 200 and 202. It can be seen that the input to the VCM path is defined by $I_{VCM}$ which is provided to summing node 180. Block 186 represents torque constants, etc., found in the circuit, and blocks 196 and 198 are integrators which integrate the signal twice and provide it to summing node 182. Block 194 represents demodulation constants, etc., and provides the output signal Y. Signal Y is fed back through differentiator 160 to summing node 180.

The PZT path is represented by the input voltage $V_{PZT}$ which is fed to block 188, which also represents torque constants. The output of block 188 is provided to summing node 184, which is, in turn, integrated twice through integrators 200 and 202, the output of which is fed though summing node 182. The output from integrator 200, which represents the velocity feed back signal, is also fed back through block 190 to summing node 184. The output of integrator 202, which represents position feedback, is also provided through block 192 to summing node 184.

Figure 6:
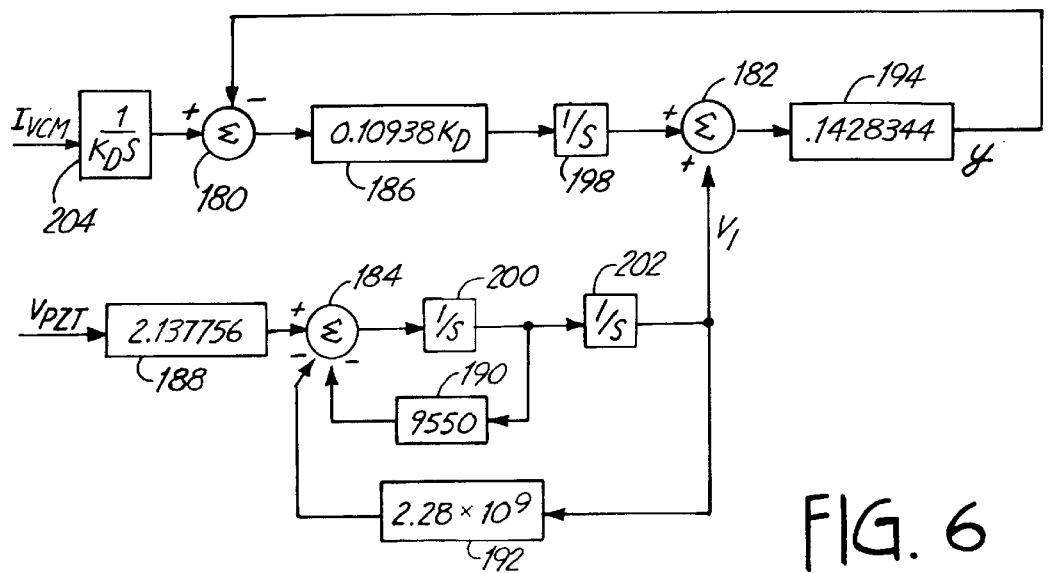

The circuit illustrated in FIG. 5 can be rewritten as that shown in FIG. 6. It will be noted that the $K_D s$ block has been moved to the left of summing node 180. It is represented by block 204. This removes differentiator 160 from the feedback path and also removes one of the integrators. It will also be noted that block 186 is slightly modified by including the gain constant $K_D$ therein.

The transfer functions for the VCM path and the PZT path are illustrated by equations 1 and 2 below:

$$\frac{Y}{I_{VCM}} = \frac{1}{K_D s}\left[\frac{\frac{1428344*0.10938K_D}{s}}{1+\frac{1428344*0.10938K_D}{s}}\right] \quad \text{Eq. 1}$$

$$= \frac{1}{K_D s}\left[\frac{1}{1+s/1428344*0.10938K_D}\right]$$

$$\frac{Y}{V_1} = \left[\frac{1428344}{1+\frac{1428344*0.10938K_D}{s}}\right] \quad \text{Eq. 2}$$

$$= \left[\frac{\frac{s}{0.10938K_D}}{1+\frac{s}{1428344*0.10938K_D}}\right]$$

It can be seen from the rewritten circuits shown in FIG. 6 and the transfer functions, that even assuming the input current to the VCM path is 0, the feedback path from Y to summing node 180, through integrator 198, affects the PZT signal. In other words, the PZT path which normally appears as a low pass filter, now looks like a differentiator. The integrator in the feedback path for the PZT makes the path appear as a differentiator so that if there is no change in the input signal (such as during a long seek operation), the PZT signal will move back, more closely centering the microactuator relative to the coarse actuator, thereby eliminating the benefit of reduced seek times which result from the microactuator being fully extended in the direction of the seek.

Figures 1, 7:
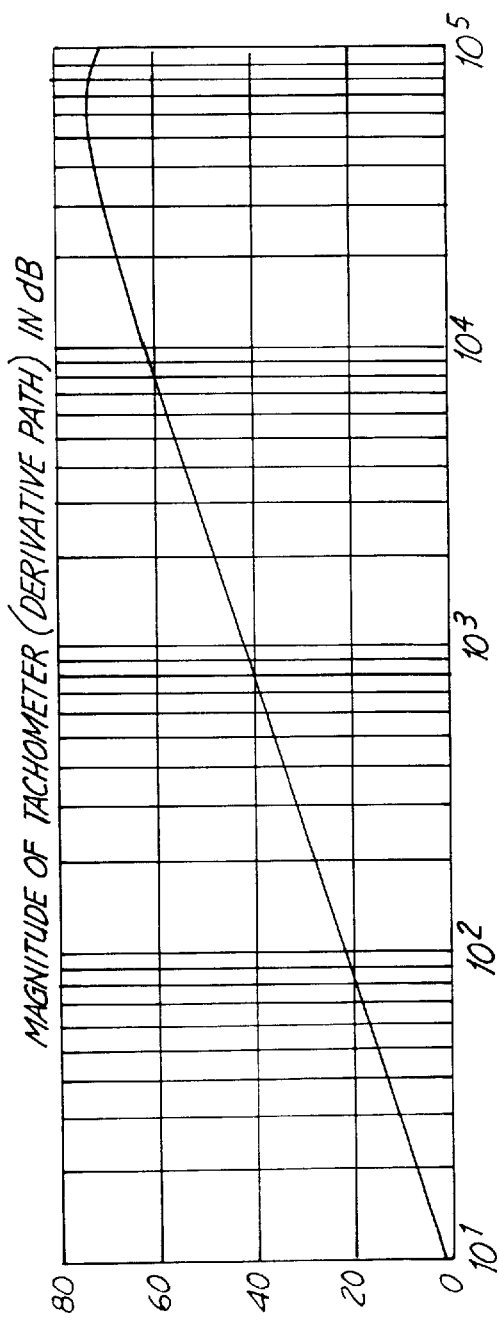
Figures 2, 7:
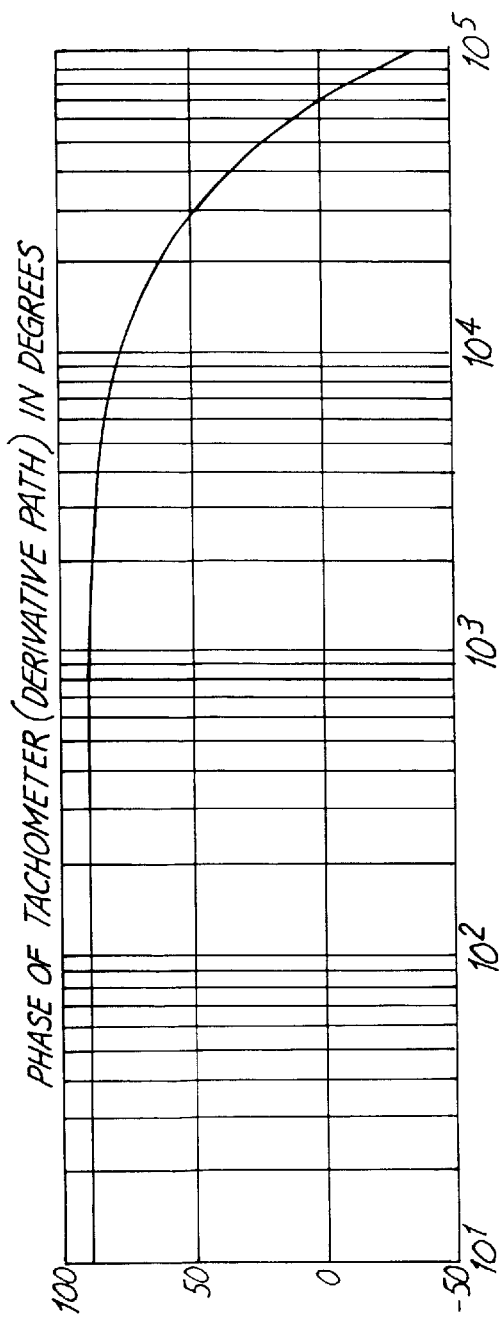
Figures 3, 7:
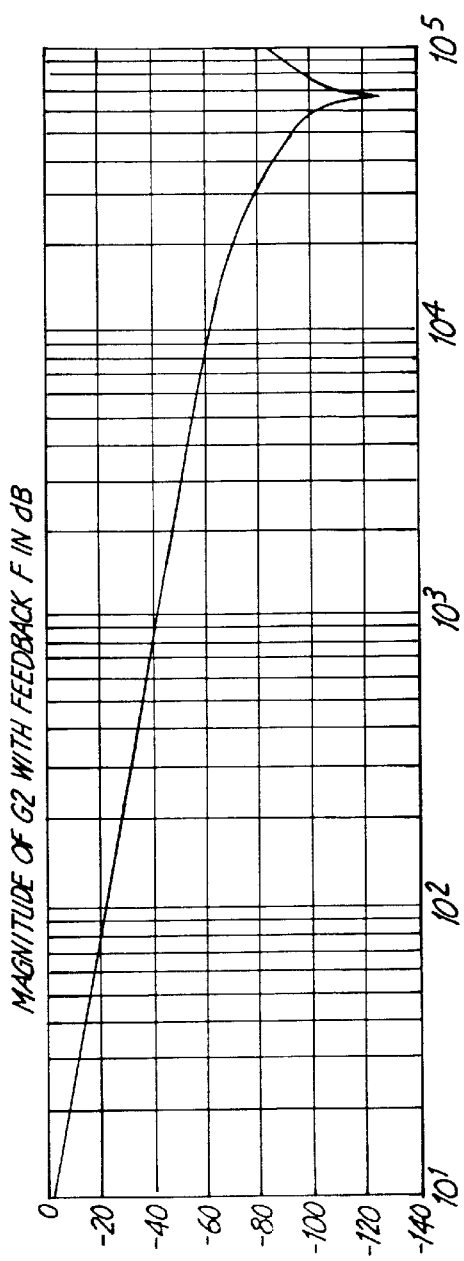
Figures 4, 7:
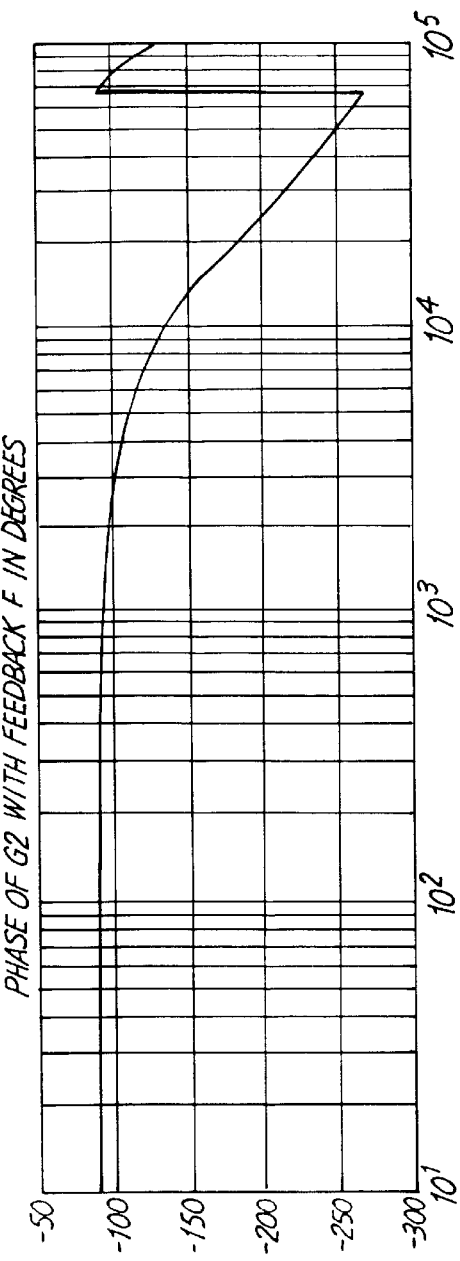
Figures 5, 7:
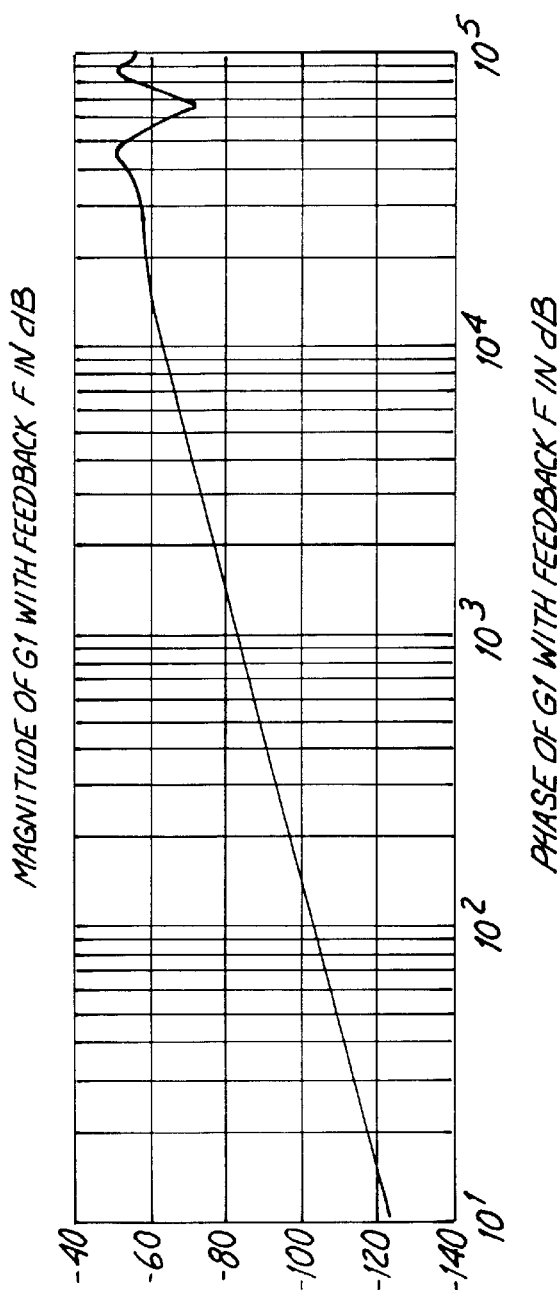
Figures 6, 7:
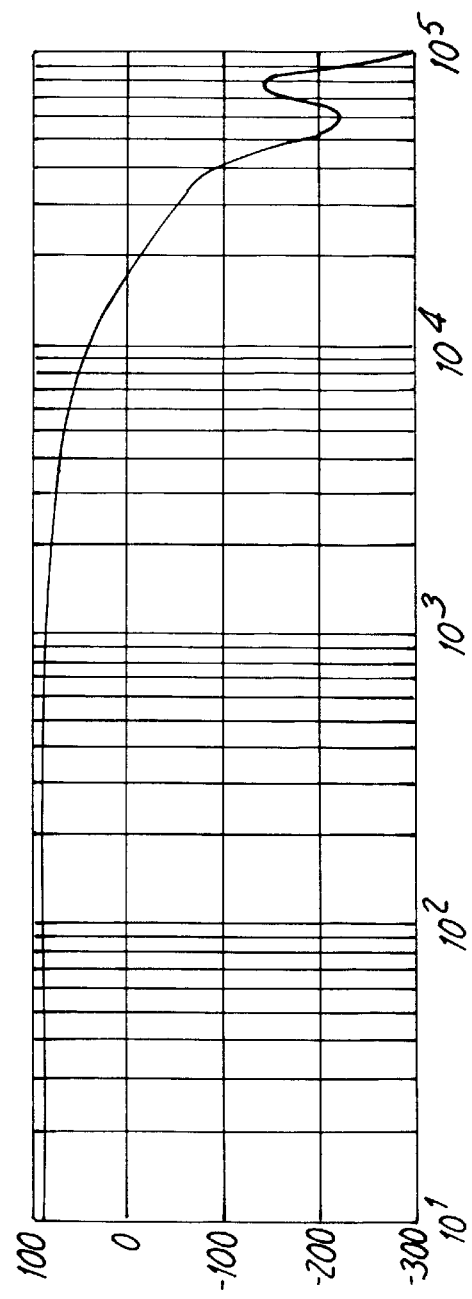

This can better be illustrated with reference to FIGS. 7-1 through 7-6. FIGS. 7-1 and 7-2 show a Bode plot, and phase diagram, respectively, for differentiator 160. It can be seen that differentiator 160 introduces a 20 dB per decade gain from very low frequencies to approximately $7 \times 10^4$ radians per second, where the gain is limited. FIGS. 7-3 and 7-4 show a Bode plot and phase diagram, respectively, for the VCM path with the differentiator feedback therein. It can be seen from these diagrams that the VCM path, with the feedback, has a −20 dB per decade gain out to approximately 20,000 radians per second, where the slope of the curve switches from −20 dB per decade to approximately −40 dB per decade. This slope change is due to the differentiator.

FIGS. 7-5 and 7-6 illustrate a Bode plot and phase diagram for the PZT path. It can be seen that the +20 dB per decade slope continues all the way to approximately 20,000 radians per second.

Since the log magnitude of the transfer function shown in FIG. 7-5 continues at a rate of 20 dB per decade all the way to a frequency of approximately 20,000 radians per second, then during long seek operations, the input frequency will decrease to a point where the transfer function slips back down the curve shown in FIG. 7-5 and will thus provide reduced gain even while the seek operation is continuing. The effect this has on the PZT actuator is that, as soon as the long seek operation has begun, the PZT actuator will be moved to its furthest extent in the direction of the seek operation. However, as the seek operation continues, the input frequency will reduce to a point where the gain provided by the PZT transfer function will reduce and the PZT actuator will gradually creep back toward the center position relative to the microactuator. This is undesirable, because it eliminates or reduces any benefits in reducing seek times gained through movement of the microactuator.

Figure 8:
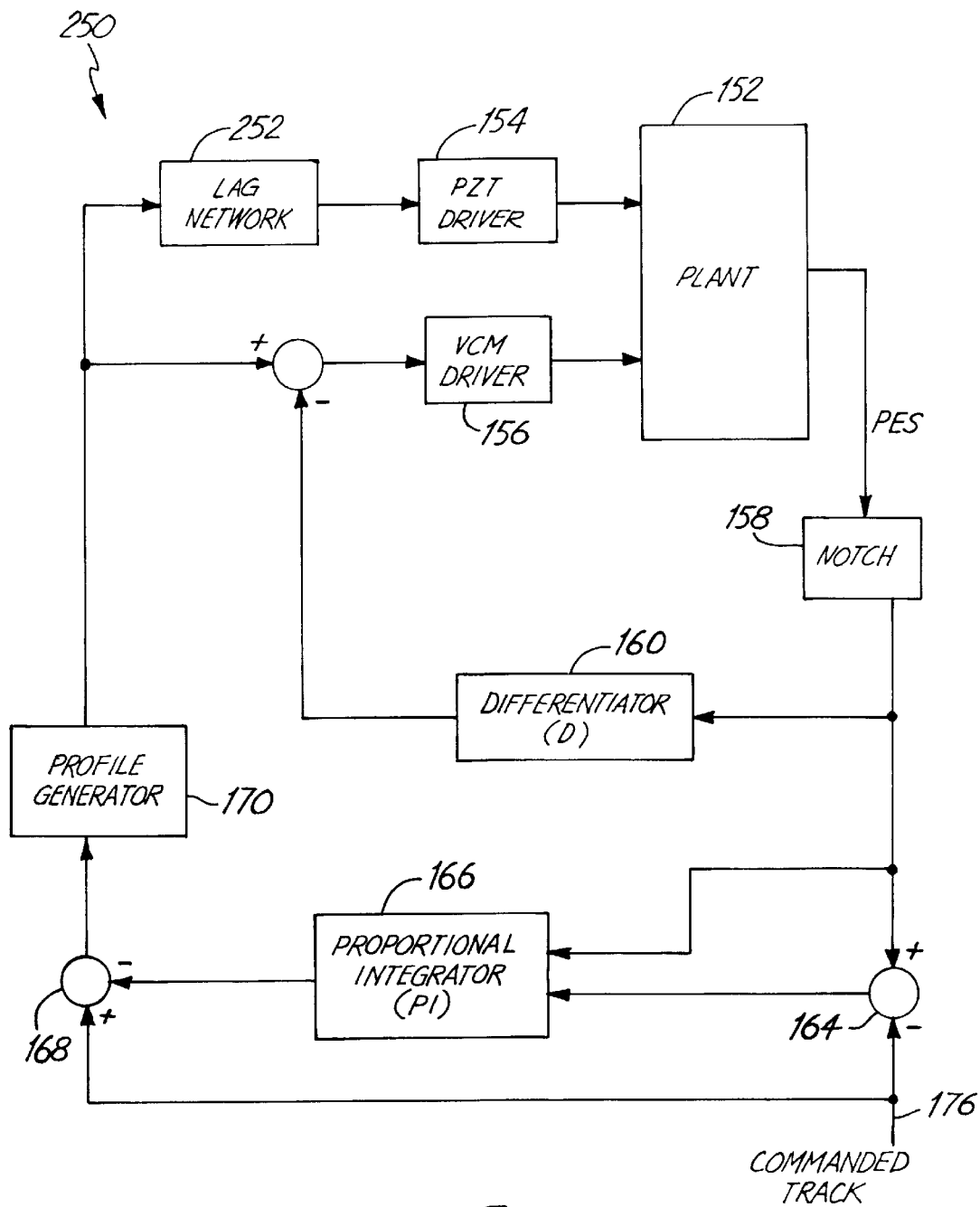
FIG. 8 is a block diagram of a control system in accordance with one embodiment of the present invention.

FIG. 8 illustrates a block diagram of another servo control circuit 250 in accordance with one aspect of the present invention. A number of the blocks are similar to those shown in FIG. 4, and are similarly numbered. However, circuit 250 also includes lag network 252 which is provided in the PZT path. Lag network 252 is configured to alter responsiveness of the microactuator by moving the break point of the Bode plot illustrated in FIG. 7-5 to a much lower frequency such that the gain through the PZT path remains constant at much lower frequencies. Lag network 252 does this by acting substantially like a band pass filter component, with a low corner frequency, by boosting low frequency components and introducing a phase loss. Thus, the control circuit can perform better during long seek operations.

Figure 9B:
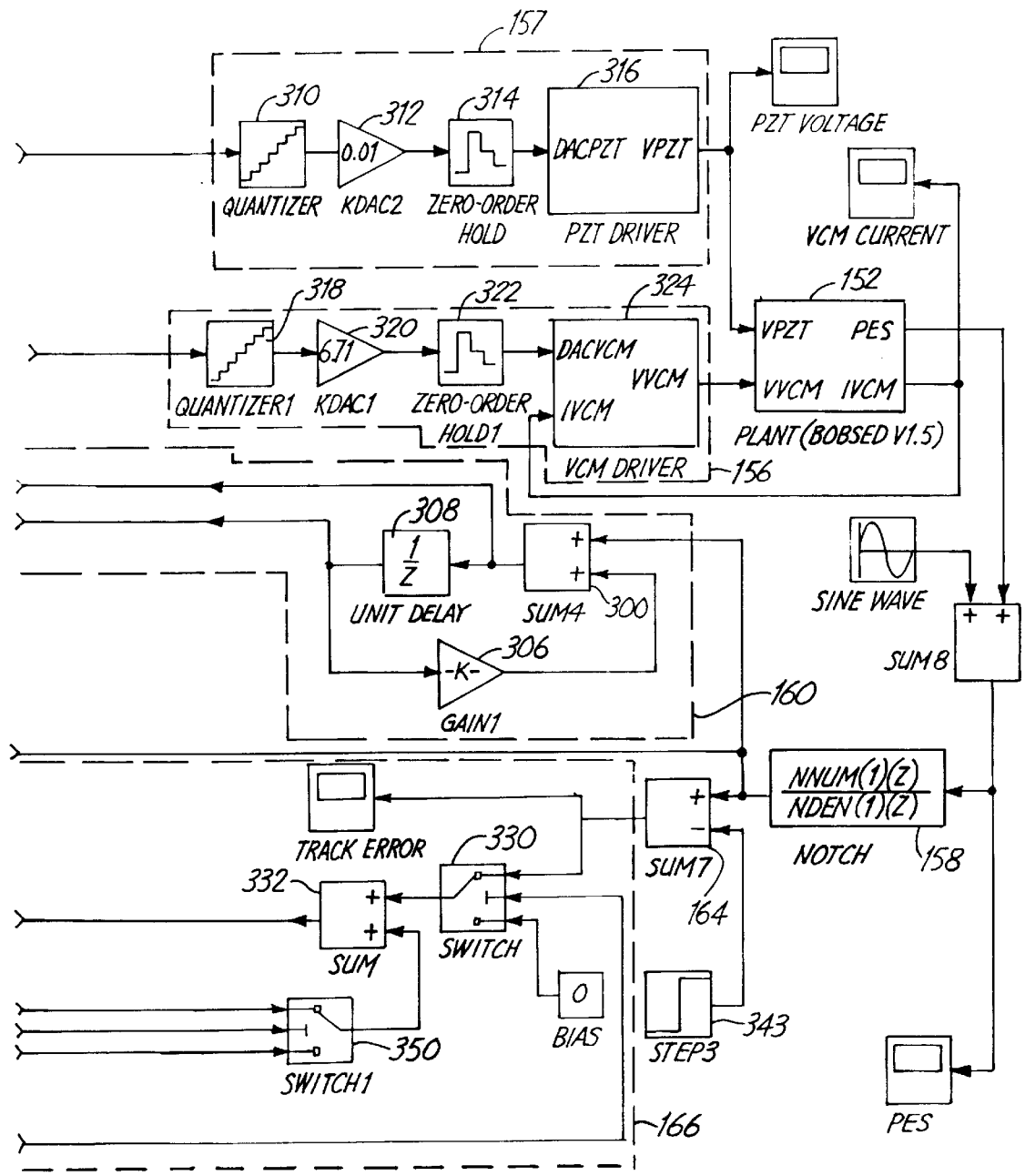

FIGS. 9, 9A and 9B show a more detailed block diagram of control system 250 shown in FIG. 8. Corresponding items are similarly numbered.

Profile generator 170 includes nonlinear gain stage 256, gain element 258, and switch 260. Lag network 252 includes gain element 262, summing node 264, saturation clipping circuit 266, delay unit 268, gain element 270, summing node 272 and gain element 274. The remaining elements do not form a part of the present invention, and are mentioned briefly later in the application.

Figures 1, 11:
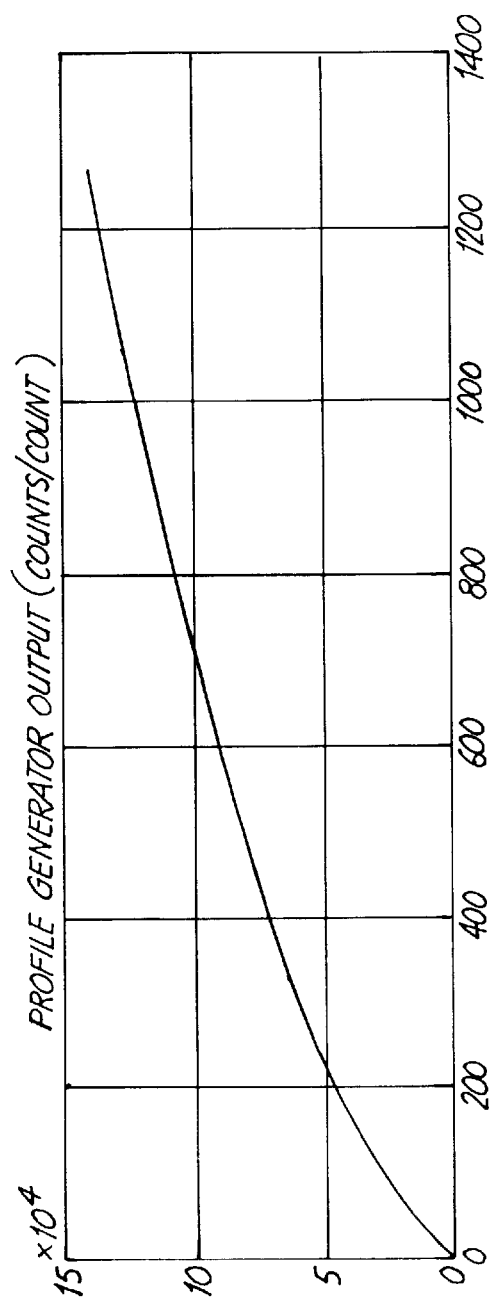
Figures 2, 11:
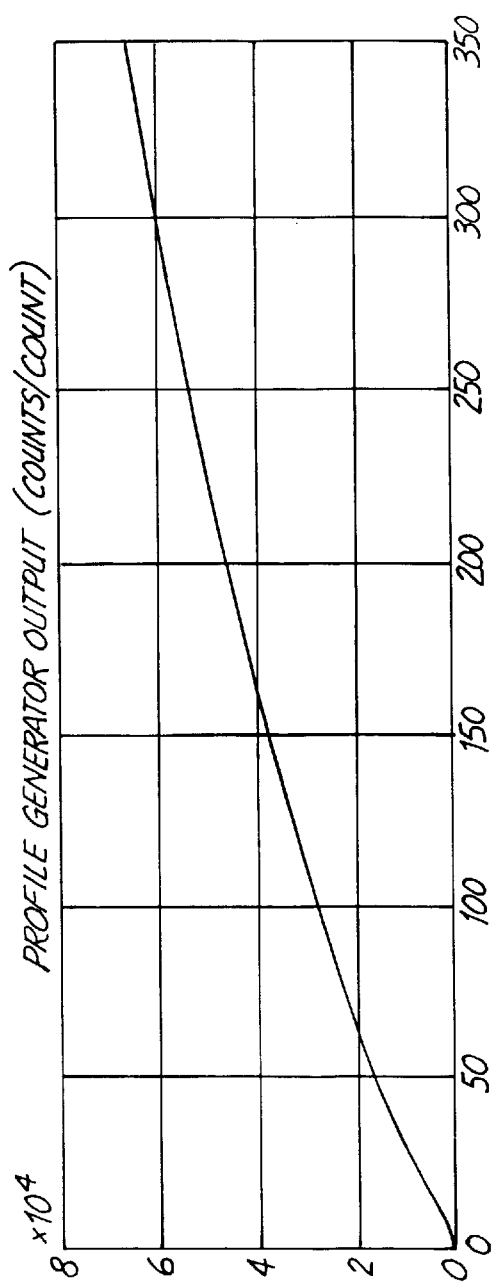
Figures 3, 11:
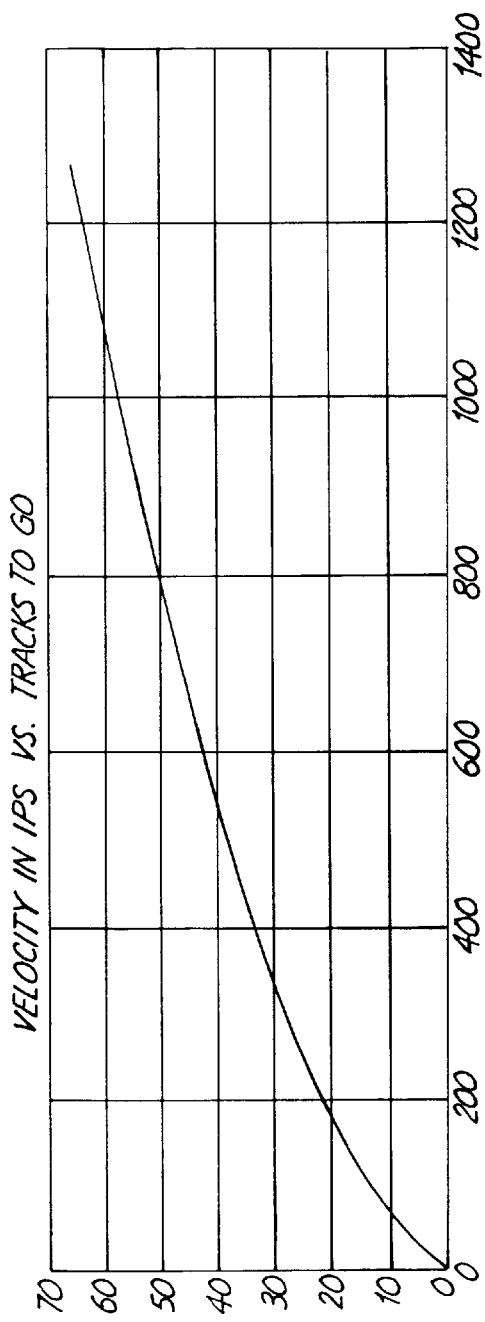
Figures 4, 11:
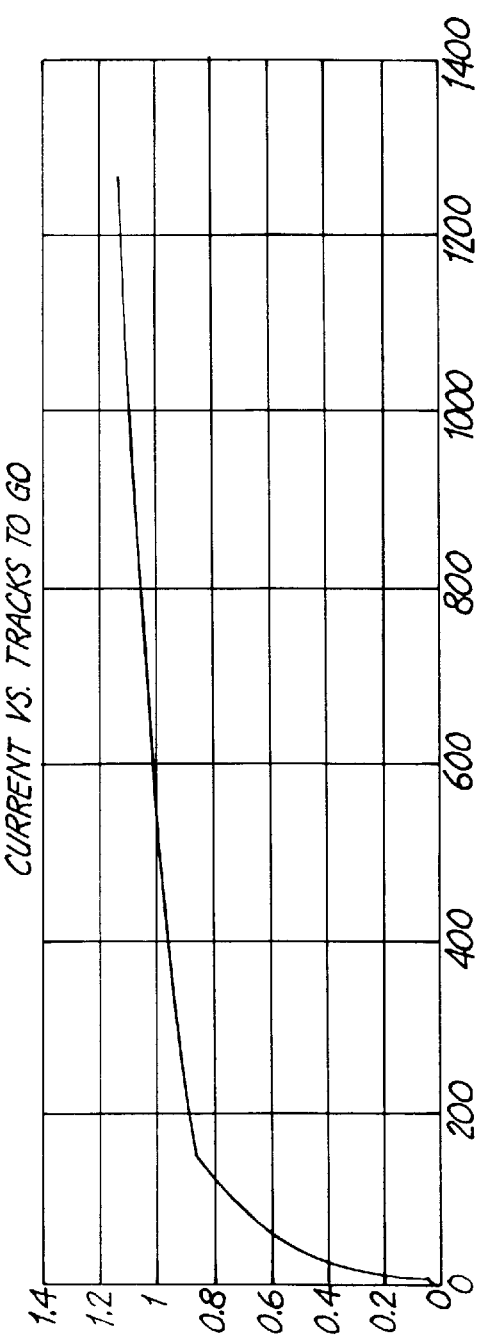

The output from summing node 168 is provided to nonlinear gain stage 256. This signal is indicative of the distance that the read head (or data head) is from the target track. When the read head is a long distance from the target track, switch 260 is switched to the position illustrated in FIG. 9 and outputs a velocity profile which is nonlinear to quickly accelerate the read head toward the target track. As the read head approaches the target track, and comes within a predetermined threshold number of tracks of the target track, switch 260 is switched such that constant gain element 258 is selected. This provides a constant gain from profile generator 170 when the data head is closer to the target track. FIGS. 11-1 and 11-2 show the response of nonlinear gain stage 256 according to two different scales. Both are graphs of output count versus input count where one count is equivalent to one track. The output of profile generator 170 is provided to both gain element 262 and lag network 252 and to summing node 162. Summing node 162 also receives at its inverting input the output of differentiator 160 and provides an output to the VCM path.

In lag network 252, gain element 262 provides a constant gain K to summing node 264 which provides an output signal to saturation circuit 266. In one illustrative embodiment, saturation circuit 266 is provided as an anti-windup circuit. Illustratively, saturation circuit 266 is simply a clipping circuit which clips the signal levels received from summing node 264 to a level just below where PZT driver 154 saturates. The clipped output of saturation circuit 266 is provided to delay circuit 268 and to summing node 272. Delay unit 268 provides a feedback output, through constant gain element 274, to summing node 264. The output of delay unit 268 is also provided through constant gain element 270, to the inverting input of summing node 272. The output of summing node 272 is provided to the PZT driver circuit 154.

Figures 1, 10:
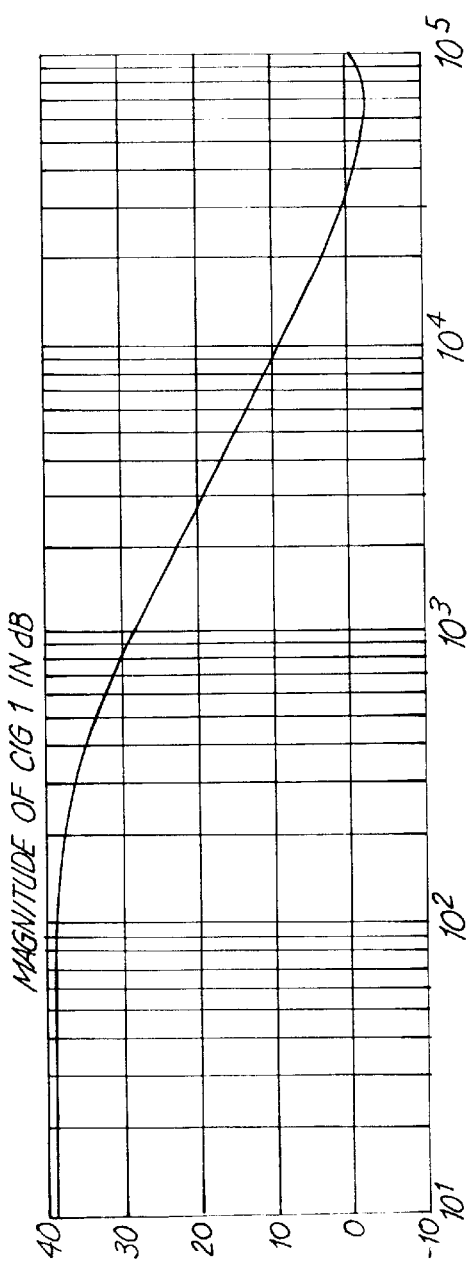
Figures 2, 10:
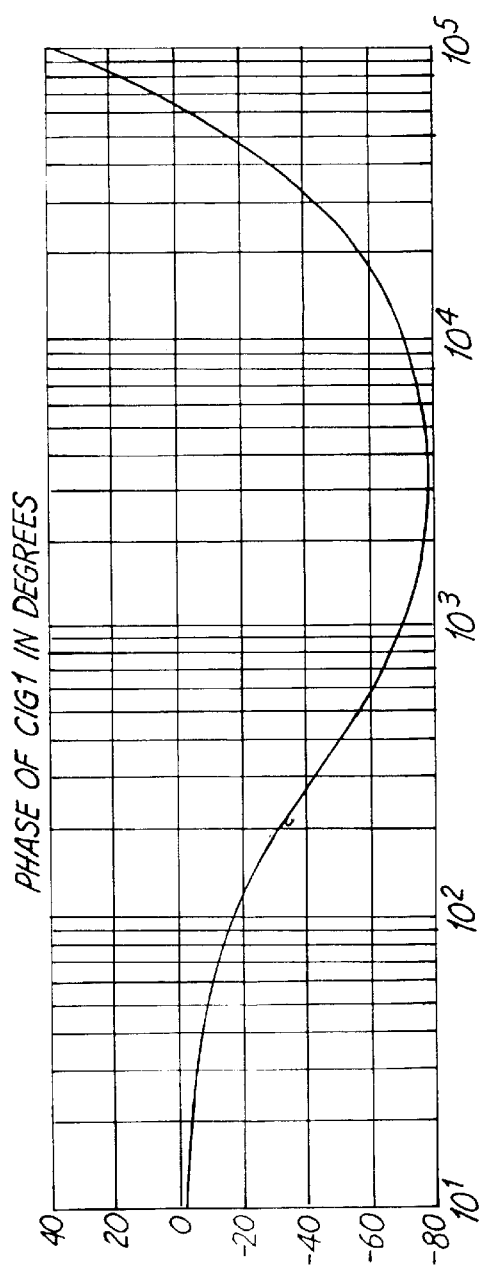
Figures 3, 10:
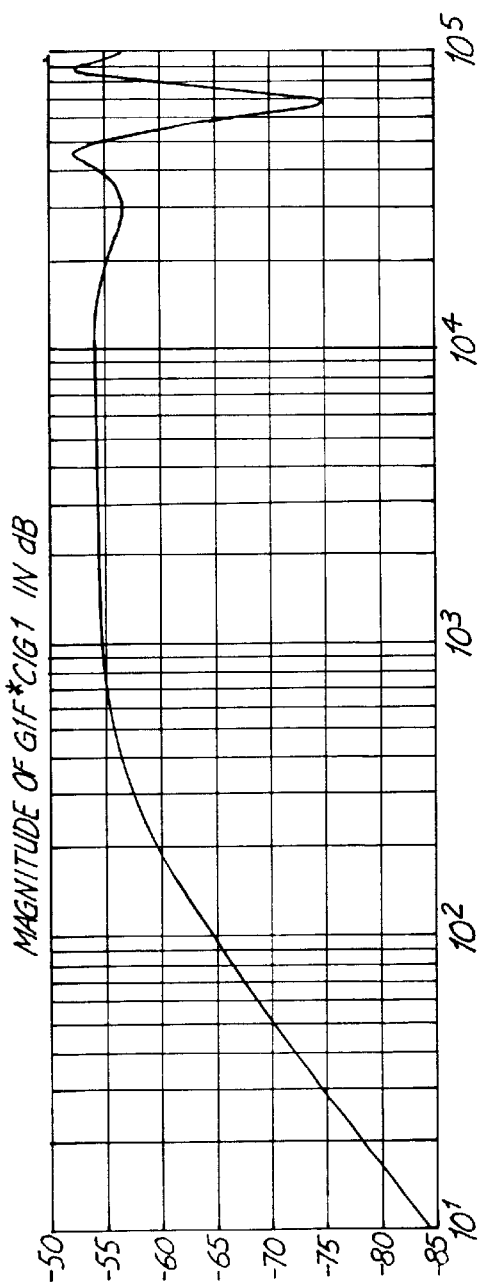
Figures 4, 10:
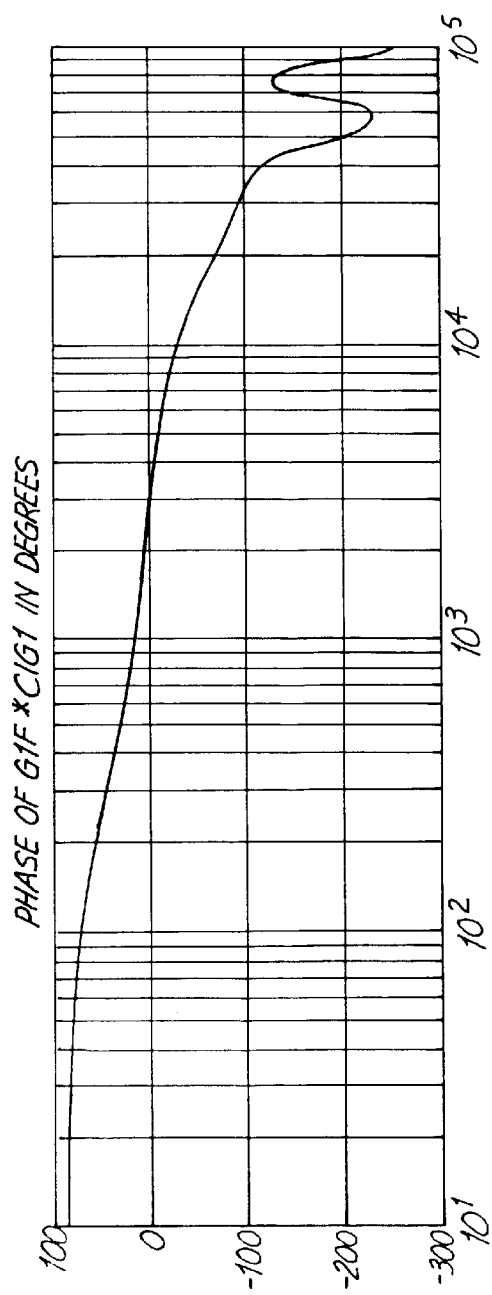
Figures 5, 10:
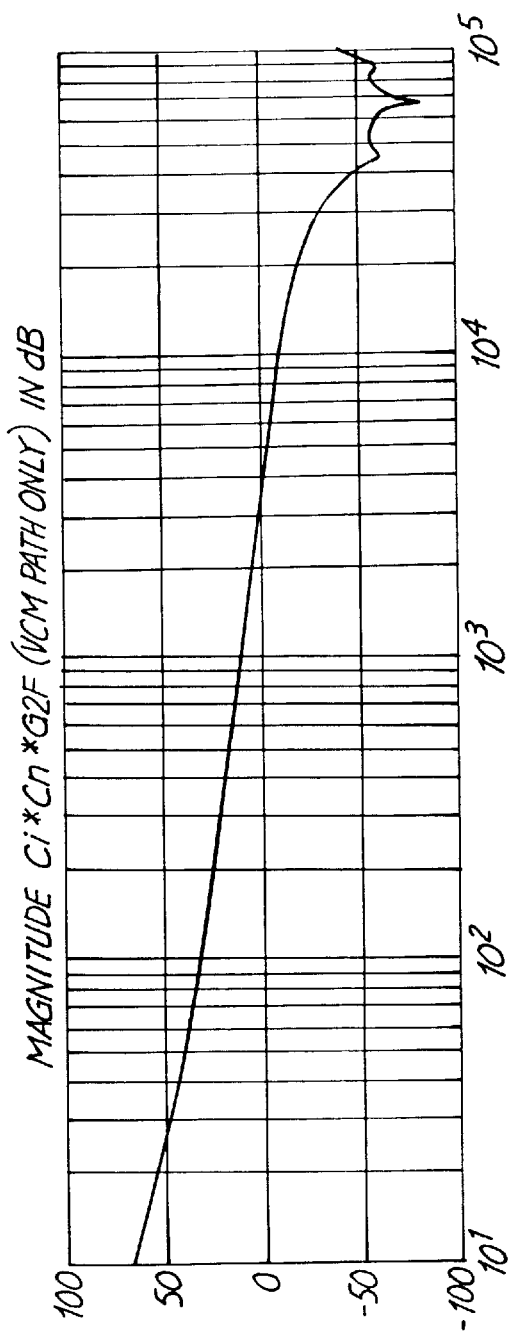
Figures 6, 10:
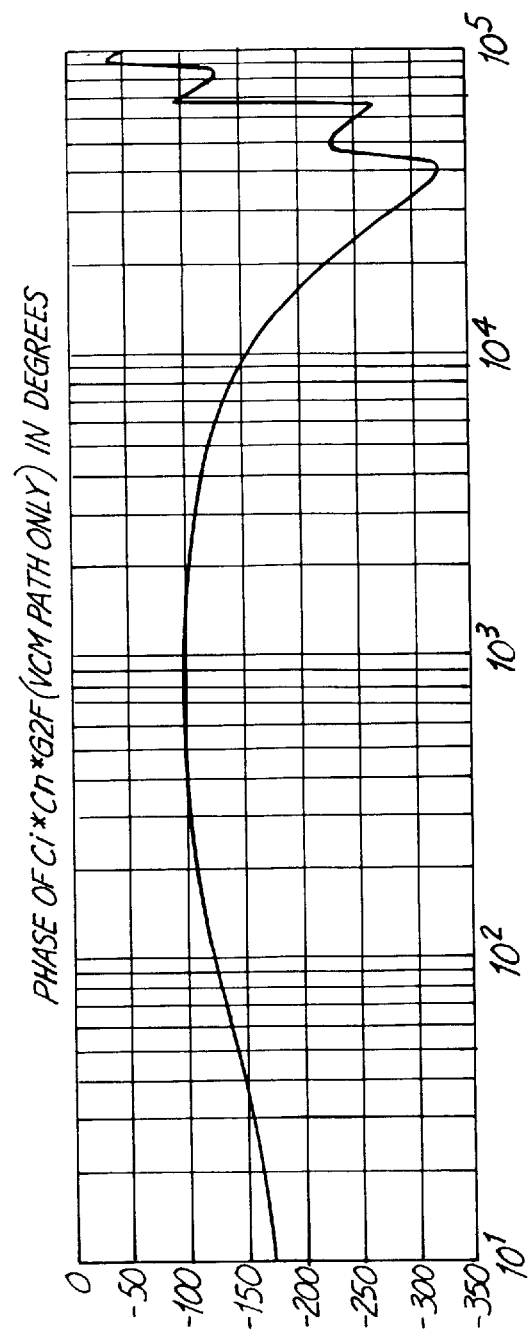
Figures 7, 10:
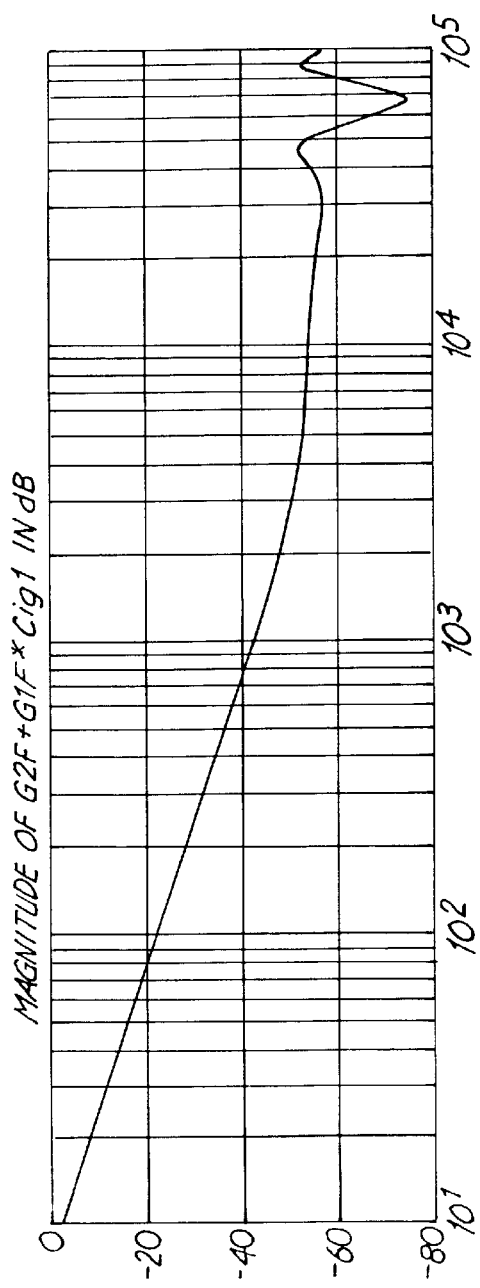
Figures 8, 10:
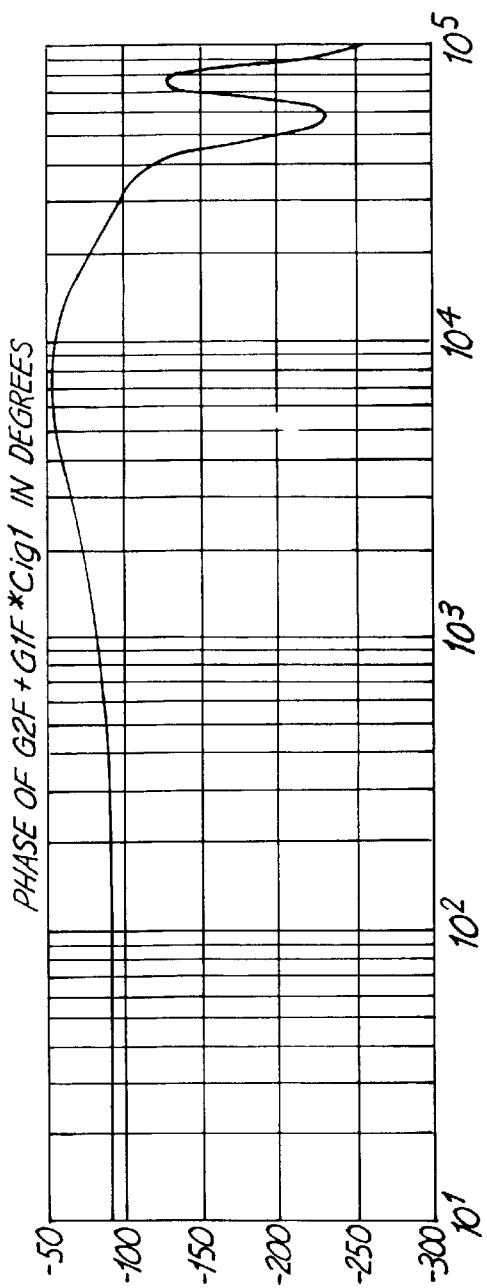

FIGS. 10-1 and 10-2 are a Bode plot, and phase diagram, respectively, for lag network 252. These diagrams illustrate that the log magnitude of the transfer function of lag network 252 has a −20 dB per decade slope at the frequencies of interest.

FIGS. 10-3 and 10-4 illustrate a Bode plot and phase diagram, for the transfer function from the input of gain element 262, (i.e., the input to lag network 252) to the output of notched PES filter 158, with differentiator 160 included in the feedback path, and assuming that the transfer function of notch filter 158 simply cancels sway modes in the PZT microactuator. It can be seen from this diagram that the log magnitude of the transfer function is constant at a much lower frequency allowing the microactuator to be less responsive in the frequencies of interest so the gain is maintained at lower frequencies.

As the PZT microactuator approaches saturation, the remaining circuit is simply the VCM path. FIGS. 10-5 and 10-6 are an open loop Bode plot and phase diagram, respectively, for the VCM path. The Bode plot illustrated in FIG. 10-5 shows this path is stable. Therefore, even if the PZT actuator were to saturate, the controller would be stable.

As mentioned in the background of the specification, Mesner noted that for dual stage actuators, in order for the two paths to constructively interfere, they must have a phase difference of less than 120 degrees at the point where the two paths have approximately equal gains. With the present circuit, it will be noted that the output of switch 260 has two paths, one through the PZT path and one through the VCM path. At low frequencies, the VCM path dominates. At intermediate frequencies (of approximately 2500 radians per second) both paths have approximately the same gain. At this point, the phase difference between the two paths should be less than approximately 120 degrees to obtain constructive interference. Above this angular frequency, the PZT path dominates. FIGS. 10-7 and 10-8 illustrate a Bode plot and phase diagram for the transfer function from the output of switch 260, to the output of notch filter 158. Both paths are being driven simultaneously and adequate phase margin is obtained.

The overall open loop Bode plot for circuit 252 is shown in FIG. 10-9, and the phase diagram is illustrated in FIG. 10-10. It can be seen that, at the OdB crossover point, there is a great deal of phase margin. Thus, the present invention provides lag network 252 which inhibits wind-up (or saturation) of the PZT driver, modifies the responsiveness of the PZT path to accommodate long seek operations, and provides a phase difference between the VCM and PZT path at the Odb crossover point (where both paths have approximately the same affect on the output) which is far less than 120 degrees.

The remaining circuit elements will now briefly be described. FIG. 9 illustrates that differentiator 160 includes summing nodes 300 and 302, gain elements 304 and 306 and delay unit 308. The Bode plot and phase diagram for differentiator 160 are shown and discussed above.

PZT driver 154 includes quantizer 310, digital-to-analog (DAC) gain stage 312, zero order hold circuit 314, and the actual driver circuit 316. Quantizer 310 quantizes the input from lag circuit 252 and provides it through gain stage 312 and zero order hold circuit 314 and to driver 316. Driver 316 converts the digital input signal to an analog voltage output signal and provides it to the PZT microactuator. VCM driver 156 includes quantizer 318, DAC gain element 320, zero order hold circuit 322, and the actual driver 324. These elements operate in a similar manner to elements 310, 312 and 314, and an analog signal is applied to the VCM.

Proportional integrator 166 includes switch 330, summing nodes 332, 334 and 336, a plurality of step input circuits 338, 340 and 342, switches 350 and 352, gain element 354 and delay element 356.

Figures 1, 12:
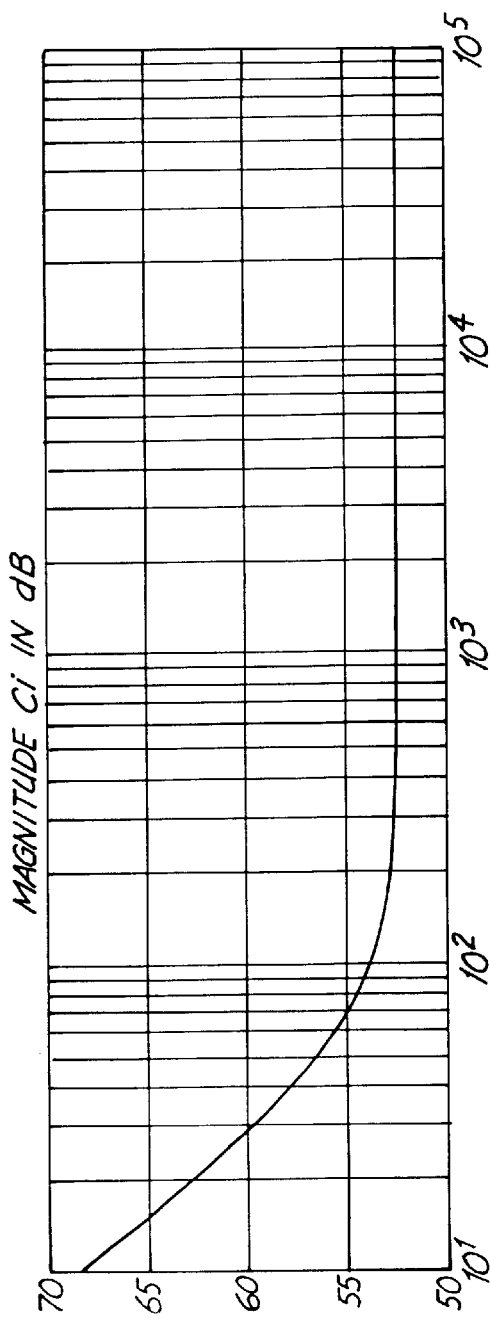
Figures 2, 12:
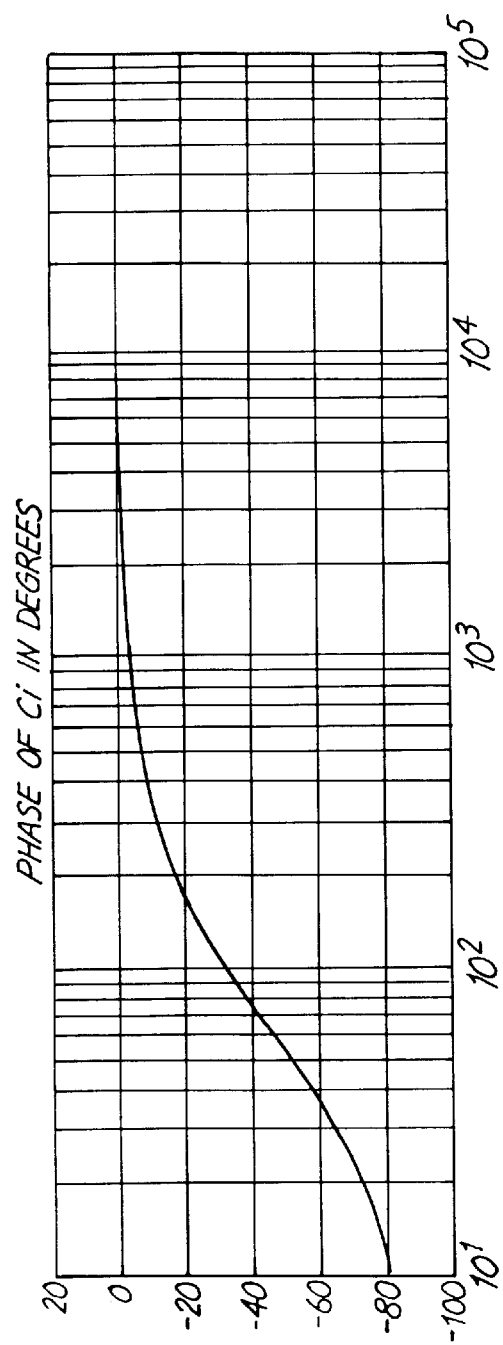

FIGS. 11-3 and 11-4 illustrate the velocity and current versus the distance of the read head from the target track. In proportional integrator 166, switches 330, 350 and 352 are configured to accommodate three different loops for track seek, track settle and track follow. For the track follow mode, switch 260 in profile generator 170 selects constant gain element 258. Switch 352 selects the output of gain element 354, switch 350 closes the feedback loop around unit delay 356 and switch 330 selects the output of summing node 164. The Bode plot and phase diagram for proportional integrator 166 is illustrated by FIGS. 12-1 and 12-2, respectively.

In the track settle mode, switch 260 selects the output of constant gain element 258, switch 352 selects a zero input and switch 350 also selects a zero input. Switch 330 forces a bias value into unit delay 356. The bias value initializes proportional integrator 166 with a cable bias so it is ready to be applied during the track follow mode.

In the track seek mode, the switches are set the same as in the track settle mode except that switch 260 selects the output of the nonlinear gain stage 256 instead of the constant gain block 258. It should also be noted that step input 342, and 343 are equal and represent, in the diagram shown in FIG. 9, the desired track location (or target track signal). The remaining two step functions 340 and 338 place the proportional integrator 66 in the configurations mentioned above for seek, settle and track follow.

Figures 1, 13:
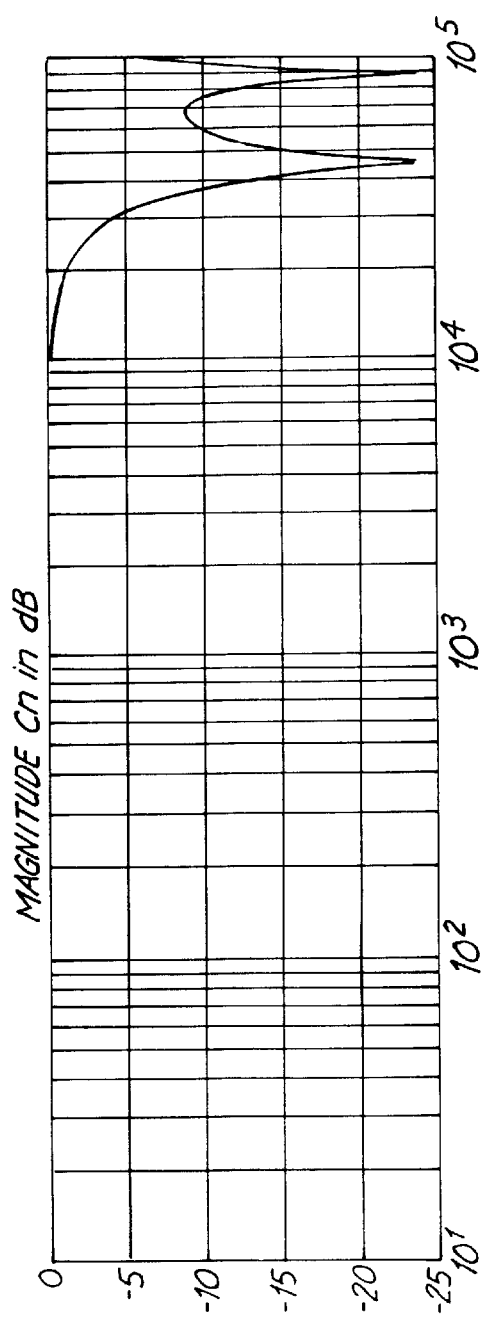
Figures 2, 13:
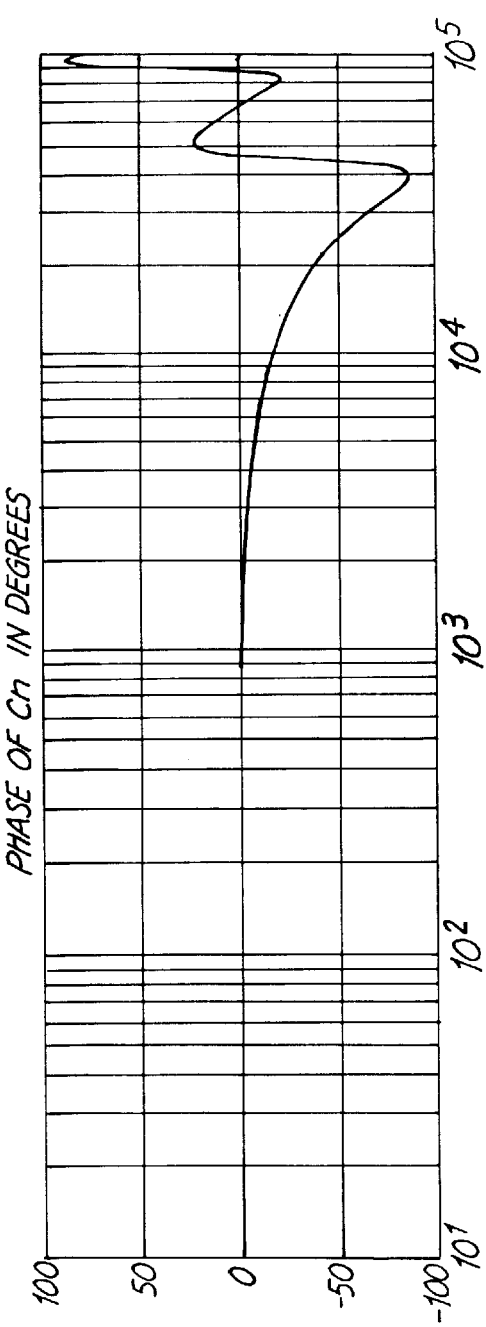

Notch filter 158 operates in a known manner and filters certain frequencies (illustratively those associated with microactuator sway) from the PES signal. FIGS. 13-1 and 13-2 illustrate the Bode plot and phase diagram for notch filter 158.

Figures 1, 14:
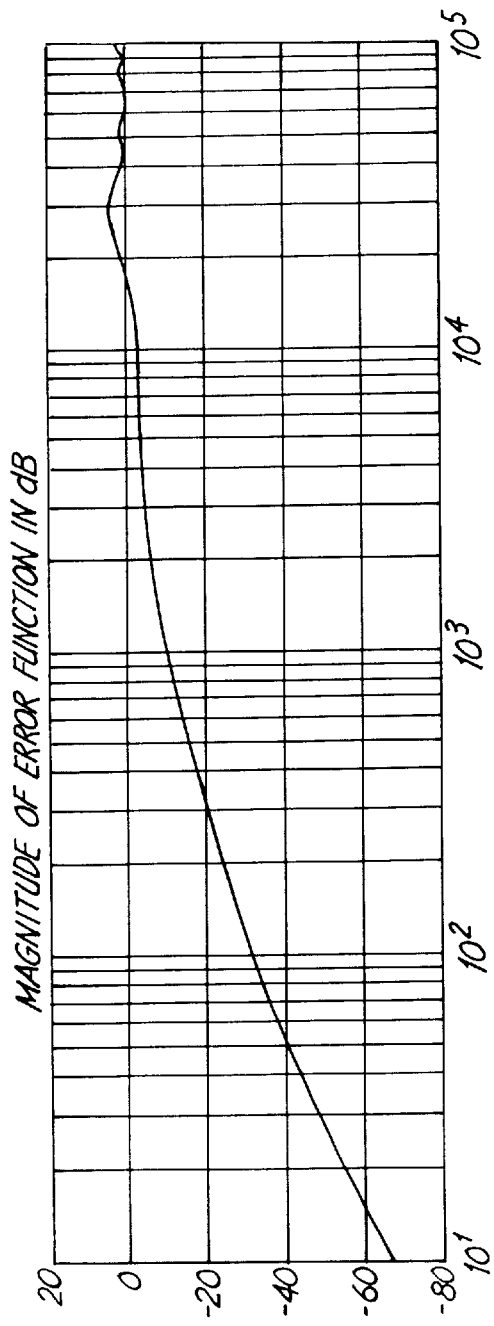
Figures 2, 14:
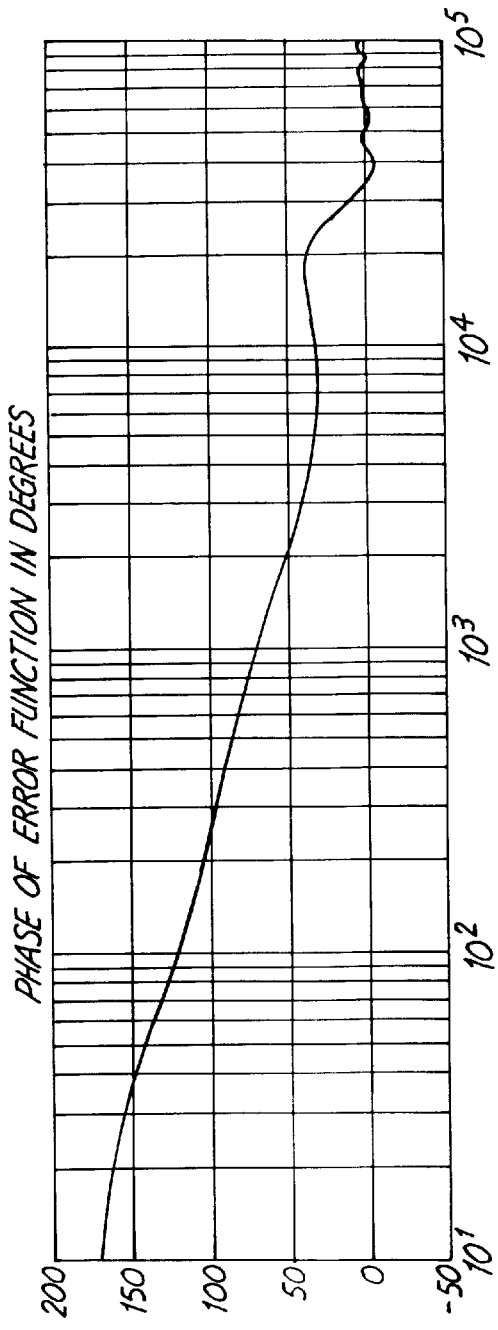

FIGS. 14-1 and 14-2 illustrate a Bode plot and phase diagram for the error function. It can be seen that the log magnitude of the error function is quite flat from approximately 2000 radians per second to 10,000 radians per second, and in fact stays negative until approximately 17,000–18,000 radians per second and peeks at approximately 30,000 radians per second. This performance is significantly enhanced over prior systems.

Figure 15:
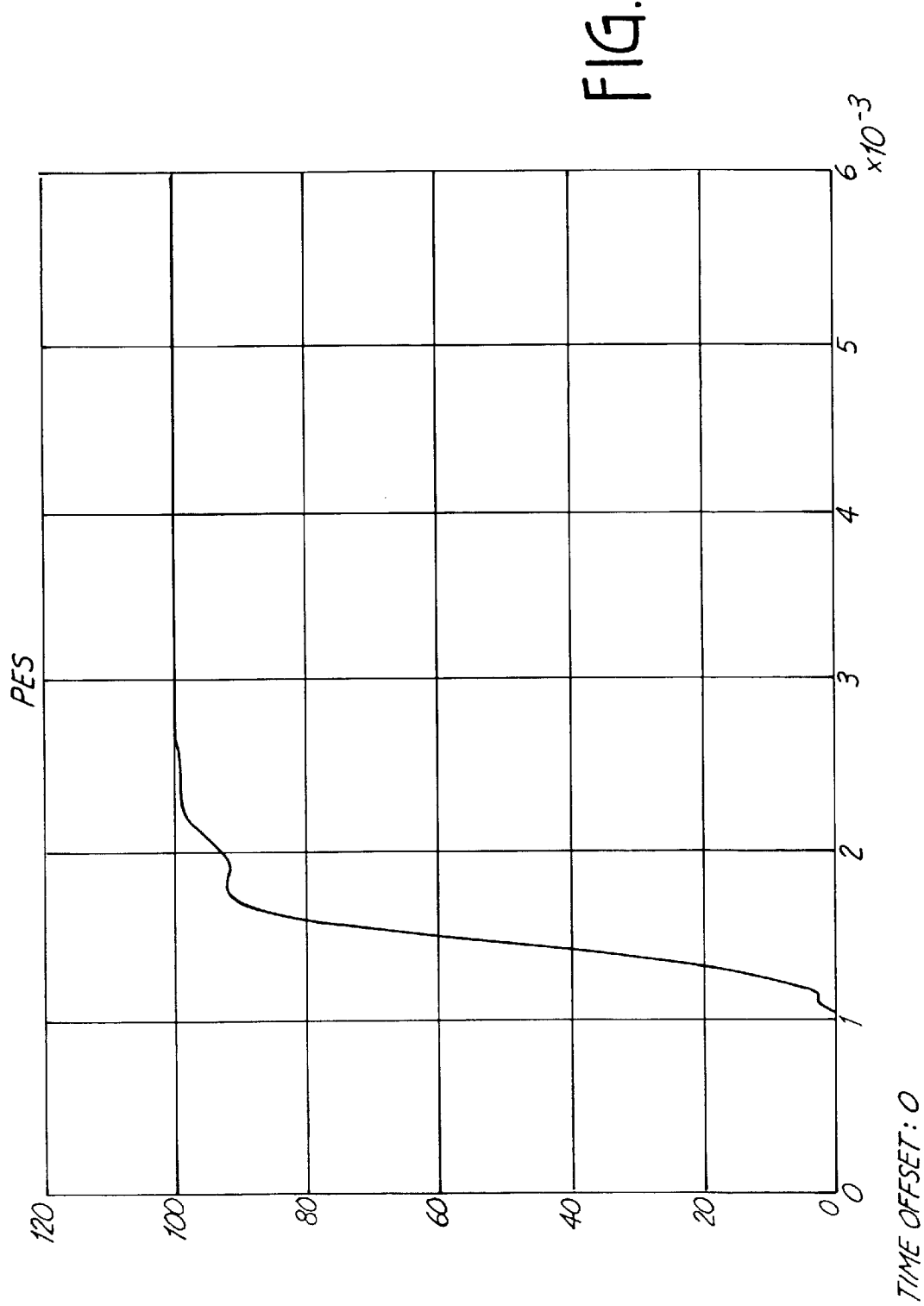
Figure 16:
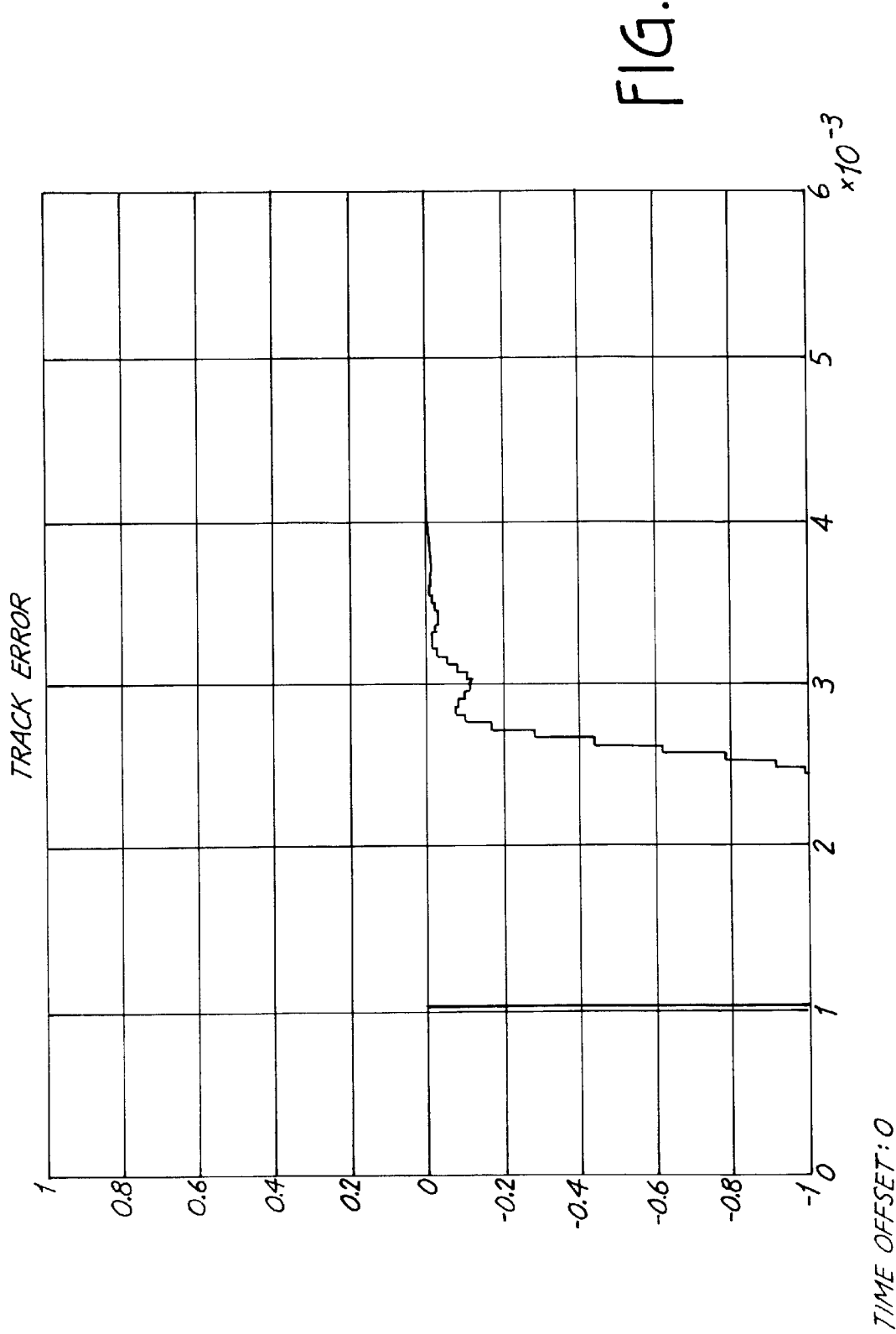
Figure 17:
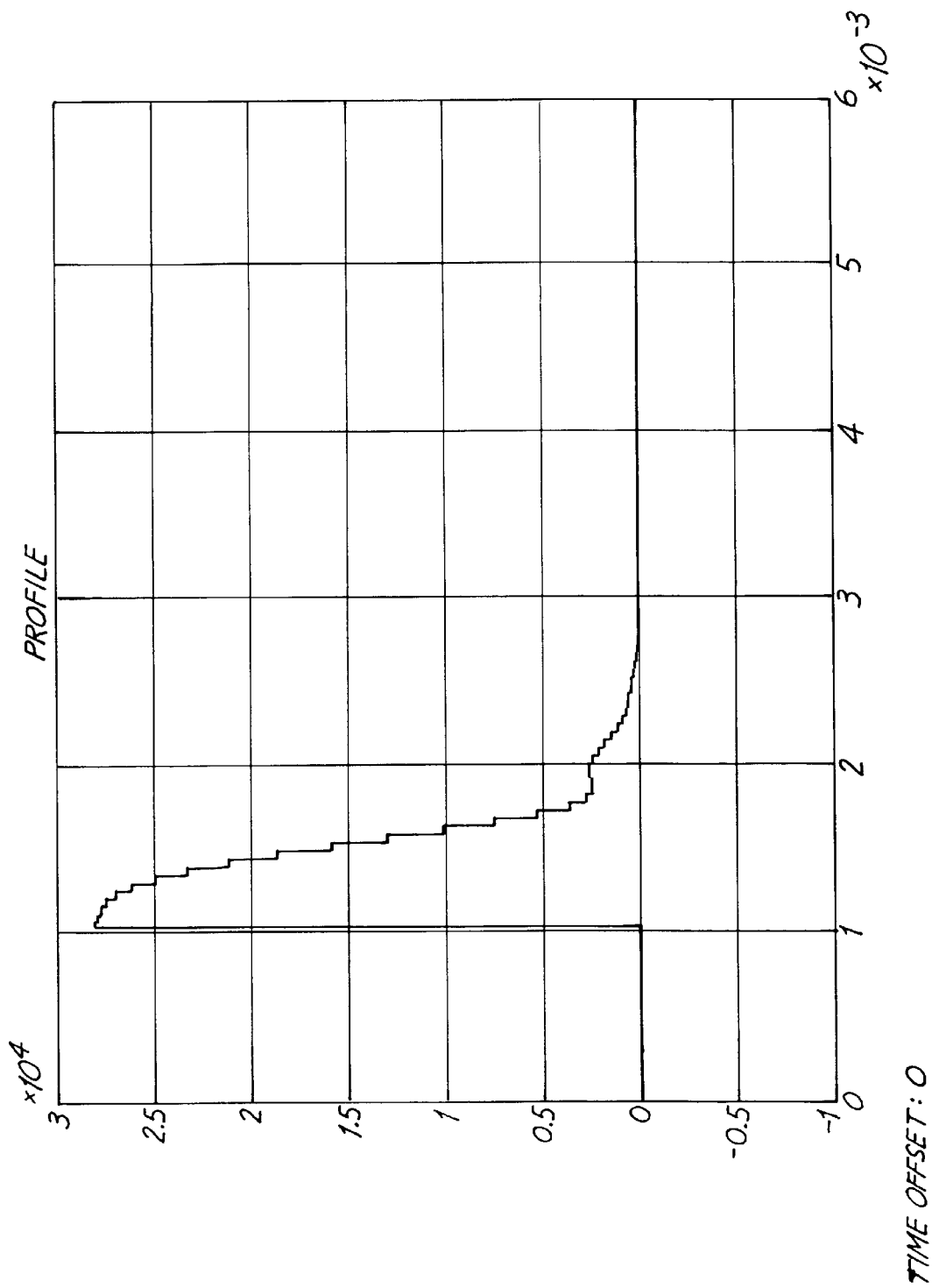
Figure 18:
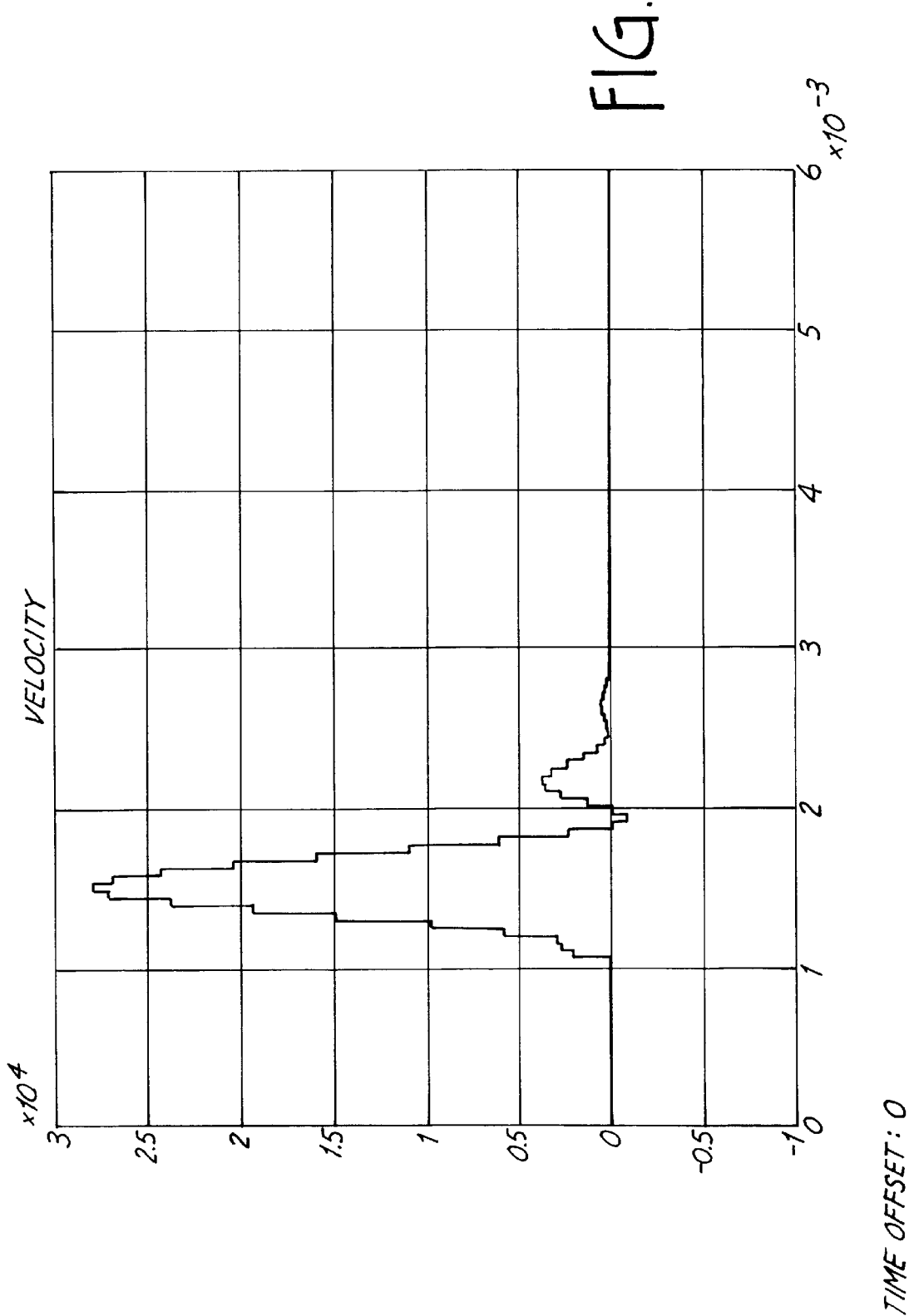
Figure 19:
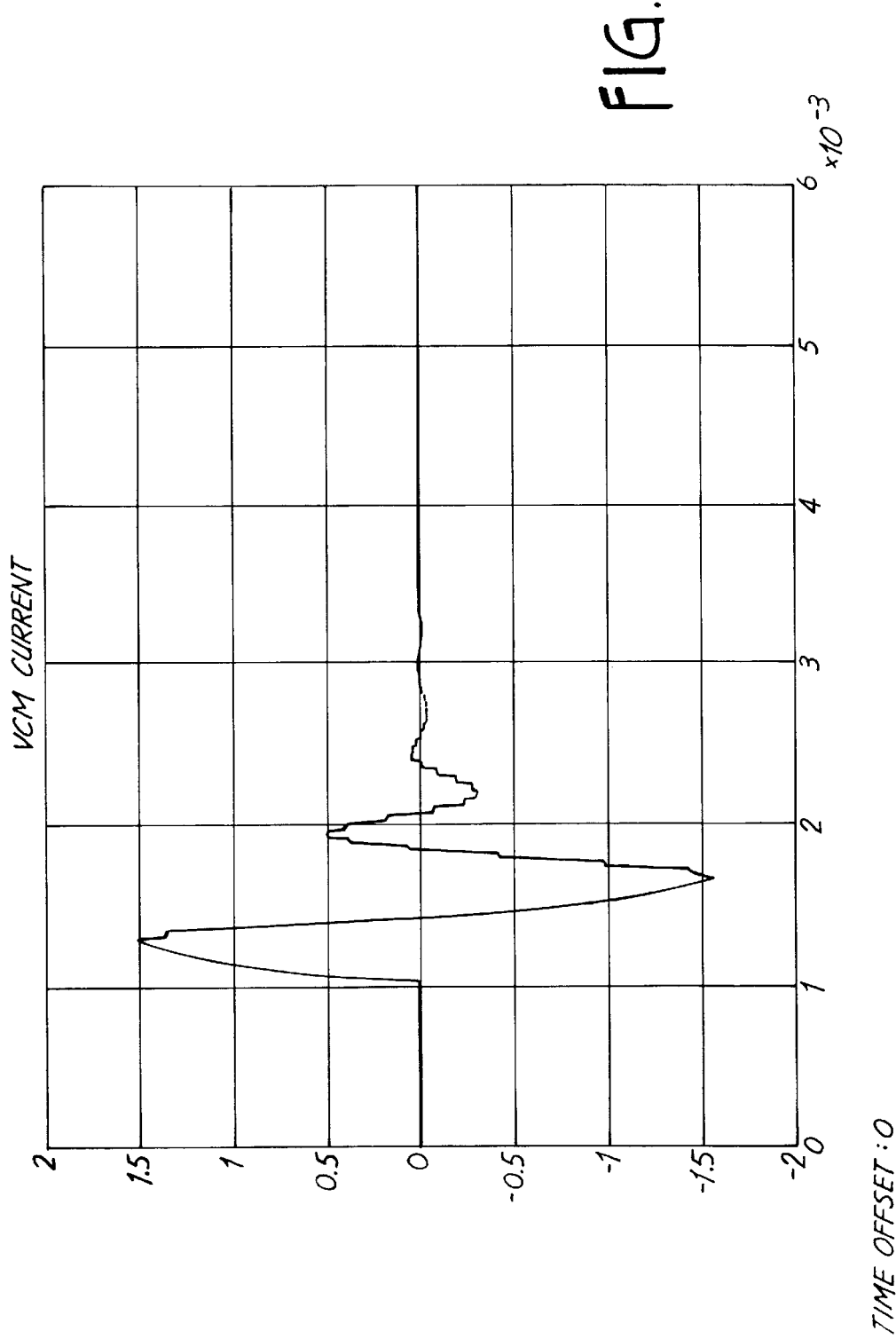

FIGS. 15–20 are time domain plots for an exemplary 100 track seek operation. The step is initiated at the one millisecond mark on all of the plots 15–20. FIG. 15 shows the position error sample (PES) in tracks plotted against time in milliseconds. FIG. 16 illustrates track error in track increments plotted against time in milliseconds. FIG. 17 illustrates the velocity profile of the data head in tracks per second against time in milliseconds. FIG. 18 illustrates a velocity tachometer output in tracks per second plotted against time in milliseconds. FIG. 19 shows the voice coil motor current plotted against time in milliseconds, and FIG. 20 illustrates the PZT voltage plotted against time in milliseconds. It can be seen from FIG. 20 that the PZT voltage saturates, which means that the microactuator is fully extended. Thus, the microactuator arrives on track first and then slowly pulls the remainder of the coarse actuator over the center of the target track.

In the present invention, a servo controller 250 controls a servo system in a disc drive 110. The servo system 250 has a coarse actuator 120 and at least one fine actuator 127. The actuators are coupled to a data head 116 to move the data head 116 (or an associated transducer) relative to a surface of a disc 112. The servo controller includes a proportional integrator 166 which receives a target track signal and an error signal and, in certain modes of operation, provides an output signal based on the error signal and target track signal. A profile generator 170 provides a profile signal based on the target track signal and, in certain modes of operation, an actual or measured track signal and the output from the proportional integrator 166. The coarse actuator 120 is driven based on the profile signal. A filter component 252 is coupled to the profile generator 170 and filters the profile signal to provide a filtered profile signal. The fine actuator 127 is driven based on the filtered profile signal.

A notch filter 158 receives a position error signal indicative of the difference between the head position and the target track center and filters notch frequencies to provide the error signal. A differentiator component 160 is coupled to the notch filter 158 and differentiates the error signal. The coarse actuator is driven based on a combination of the profile signal and the differentiator signal.

In one embodiment, the filter component is configured to offset a gain associated with the differentiator through a movement frequency range. In one embodiment, the frequency range is less than approximately 20,000 radians per second, and maybe between approximately 7000 radians per second to approximately 12,000 radians per second.

In one embodiment, the differentiator 160 has a slope of approximately 20 dB per decade of radians per second over the movement frequency range, and the filter component 252 has a slope of approximately −20 dB per decade of radians per second over the movement frequency range.

The fine actuator 127 includes a fine actuator driver 154 receiving the filtered signal and driving the fine actuator 127 based on the filtered signal. The filter component 252 includes a clamping component 266 configured to clamp a level of the filtered profile signals based on a saturation level of the fine actuator driver 154.

Although the present invention has been described with reference to preferred embodiments, workers skilled in the art will recognize that changes may be made in form and detail without departing from the spirit and scope of the invention.

What is claimed is:

1. A servo system controlling positioning of a data head relative to a disc surface on a disc in a disc drive, the servo system comprising:

a coarse actuator coupled to the data head to move the data head;

a fine actuator coupled to the data head to move the data head relative to the coarse actuator;

a control system having a fine actuator control component and a coarse actuator control component wherein the fine and coarse actuator control components are configured such that, at a frequency at which both the fine and coarse actuator control components have approximately equal gains, a phase difference between outputs of the fine and coarse actuator control components is less than approximately 120 degrees, for track seek operations.

2. The servo system of claim 1 wherein the control system comprises:

a proportional-integrator (PI) component receiving a target track signal, indicative of a target track, and a measured track signal indicative of an actual track corresponding to current head position and, during track seeks, providing a PI output signal based on the measured track signal and the target track signal;

a profile generator component providing a profile signal based on the PI output signal, the coarse actuator being driven based on the profile signal; and a filter component coupled to the profile generator and filtering the profile signal to provide a filtered profile signal, the fine actuator being driven based on the filtered profile signal.

3. The servo system of claim 2 wherein the control system further comprises:

a notch filter receiving a position error signal indicative of the difference between the head position and the target track and filtering notch frequencies to provide the error signal; and a differentiator component coupled to the notch filter, differentiating the error signal to provide a differentiator signal, the coarse actuator being driven based on a combination of the profile signal and the differentiator signal.

4. The servo system of claim 3 wherein the filter component is configured to offset a gain associated with the differentiator through a movement frequency range.

5. The servo system of claim 4 wherein the movement frequency range is less than approximately 20,000 radians per second.

6. The servo system of claim 5 wherein the movement frequency range is approximately 7000 radians per second to approximately 12000 radians per second.

7. The servo system of claim 2 wherein the fine actuator includes a fine actuator driver receiving the filtered profile signal and driving the fine actuator based on the filtered profile signal, the filter component including a clamping component configured to clamp a level of the filtered profile signal based on a saturation level of the fine actuator driver.

8. The servo system of claim 2 wherein the fine and coarse actuator control components are configured such that, at a frequency at which both the fine and coarse actuator control components have approximately equal gains, a phase difference between outputs of the fine and coarse actuator control components is less than approximately 120 degrees, for track settle operations.

9. The servo system of claim 4 wherein the differentiator has a slope of approximately 20 Decibels (dB) per decade in radians per second over the movement frequency range, and wherein the filter component has a slope of approximately −20 dB per decade in radians per second over the movement frequency range.

10. The servo system of claim 9 wherein the filter component comprises a lag network.

11. A servo system controlling positioning of a data head relative to a disc surface on a disc in a disc drive, the servo system comprising:
- a coarse actuator coupled to the data head to move the data head;
- a fine actuator coupled to the data head to move the data head relative to the coarse actuator; and
- a servo controller configured to control actuation of the coarse and fine actuators during track seek operations, the servo controller comprising at least a proportional integrator component.

12. A servo control system comprising:
- a profile generator component configured to provide a profile signal to drive a coarse actuator based on a received input signal, the input signal based on:
  - a measured track signal and a target track signal, during a track seek operation; and
  - the target track signal, an error signal and a bias signal, during a settle operation; and
- a filter component coupled to the profile generator to provide a filtered profile signal to drive at least one fine actuator during the track seek operation, the filtered profile signal having a low corner frequency that is reduced from that in the profile signal.

13. The servo control system of claim 12 and further comprising:
- a proportional-integrator (PI) component receiving the measured track signal and the error signal and providing a PI output signal; and
- a signal combining component combining the PI output signal and the target track signal to obtain the input signal to the profile generator.

14. The servo control system of claim 13 and further comprising:
- a notch filter receiving a position error signal indicative of the difference between the position of the head and the target track and filtering notch frequencies to provide the error signal; and
- a differentiator component coupled to the notch filter, differentiating the error signal to provide a differentiator signal, the coarse actuator being driven based on a combination of the profile signal and the differentiator signal.

15. The servo control system of claim 14 wherein the filter component is configured to offset a gain associated with the differentiator through a movement frequency range.

16. The servo control system of claim 15 wherein the movement frequency range is less than approximately 20,000 radians per second.

17. The servo control system of claim 16 wherein the movement frequency range is approximately 7000 radians per second to approximately 12000 radians per second.

18. The servo control system of claim 15 wherein the differentiator has a slope of approximately 20 Decibels (dB) per decade in radians per second over the movement frequency range, and wherein the filter component has a slope of approximately −20 dB per decade in radians per second over the movement frequency range.

19. The servo control system of claim 12 wherein the fine actuator includes a fine actuator driver receiving the filtered profile signal and driving the fine actuator based on the filtered profile signal, the filter component including a clamping component configured to clamp a level of the filtered profile signal based on a saturation level of the fine actuator driver.

20. The servo control system of claim 12 wherein the filter component comprises a lag network.

* * * * *